United States Patent [19]

Sekizawa

[11] Patent Number: 5,675,130
[45] Date of Patent: Oct. 7, 1997

[54] POSITION SENSING METHOD FOR USE IN COORDINATE INPUT APPARATUS

[75] Inventor: Yasushi Sekizawa, Otone-machi, Japan

[73] Assignee: Wacom, Co., Ltd., Saitama-ken, Japan

[21] Appl. No.: 492,451

[22] Filed: Jun. 20, 1995

[30] Foreign Application Priority Data

Apr. 27, 1995 [JP] Japan .................................. 7-127289

[51] Int. Cl.$^6$ .............................. G08C 21/00; G09G 3/02
[52] U.S. Cl. .............................. 178/18; 178/19; 345/176; 345/179
[58] Field of Search .............................. 178/18, 19, 20; 345/156, 158, 174, 176, 179

[56] References Cited

U.S. PATENT DOCUMENTS

| | | | |
|---|---|---|---|
| 4,581,761 | 4/1986 | Ichinokawa | 178/18 |
| 4,752,655 | 6/1988 | Tajiri | 178/20 |
| 4,794,209 | 12/1988 | Asada | 178/19 |
| 4,890,096 | 12/1989 | Taguchi | 178/19 |

FOREIGN PATENT DOCUMENTS

| | | |
|---|---|---|
| 58-16506 | 3/1983 | Japan . |
| 2-53805 | 11/1990 | Japan . |
| 3-67320 | 3/1991 | Japan . |
| 3-147012 | 6/1991 | Japan . |
| 5-241722 | 9/1993 | Japan . |

*Primary Examiner*—Curtis Kuntz
*Assistant Examiner*—Vijay Shankar
*Attorney, Agent, or Firm*—Shlesinger, Arkwright & Garvey LLP

[57] ABSTRACT

A position sensing method in a coordinate sensing apparatus comprising a sensor section forming a sensor plane, a plurality of sensor coils arranged side by side along coordinate axes, and a position indicator having at least a coil. The method provides at least a coordinate value of a position indicated by the position indicator and an inclination of the position indicator in relation to the sensor plane by the use of a value of a sensing signal including a main peak value and at least one subpeak value, both being obtained from interactive action between the position indicator and a specified sensor coil from the group of sensor coils.

21 Claims, 16 Drawing Sheets

POSITION SENSING METHOD FOR USE IN COORDINATE INPUT APPARATUS

BACKGROUND OF THE INVENTION

1. Field of the Invention

This invention relates to a position sensing method for use in a coordinate input apparatus which is called a digitizer or a tablet, and more particularly to a method for scanning a plurality of sensor coils arranged side by side on a sensor section of the coordinate input apparatus.

2. Description of the Prior Art

Various types of position sensing methods for use in a coordinate input apparatus are already known. An electromagnetic transfer method disclosed in Unexamined Japanese Patent Publn. Nos. HEI-2(1990)-53805 and HEI-3 (1991)-147012 will now be explained as one example of the position sensing methods.

FIG. 1 is a schematic block diagram for illustrating the principle operation of a coordinate input apparatus using an electromagnetic transfer method. The coordinate input apparatus employing this method is made up of a sensor section (for simplicity only a group of X-axis sensor coils are illustrated) which constitutes a sensor plane by the arrangement of a plurality of sensor coils side by side in a direction of position sensing (in the direction of an X or Y axis); and a position indicator such as a stylus pen, a cursor housing a coil or a resonance circuit. In the electromagnetic transfer method, a coordinate value of an indicated position is obtained on the basis of a receiving signal obtained as a result of the transfer of an electromagnetic wave between the position indicator and one sensor coil in the sensor section. In addition to the acquisition of coordinate value data of the indicated position, the coordinate input apparatus usually has another objective, that is, the acquisition of switch data for specifying each type of operation at the indicated position. Accordingly, a means for inputting the switch data is also housed in the position indicator. For example, there is a mechanism as the means for inputting switch data, wherein an element such as a capacitor is added to the coil or the resonance circuit for slightly changing resonance conditions thereof.

The sensing of a coordinate is usually effected for two directions, i.e., the X and Y axes in the sensor section, and therefore a pair of sensor sections are crossed at right angles in such a way that the sensing sections are respectively provided along the X and Y axes.

With reference to FIG. 1, a position sensing process in the electromagnetic transfer method will now be described. A high frequency signal generation circuit provides a selected sensor coil with a high frequency signal, as a result an electromagnetic wave develops (a transmission signal). Then, the electromagnetic wave causes a resonance circuit housed in the position indicator to resonate (when the position indicator is situated on this sensor coil). When the generation of the electromagnetic wave from the sensor coil is terminated (namely; the supply of the high frequency signal is interrupted) a response electromagnetic wave develops in the resonance circuit in the position indicator. This response electromagnetic wave is received by the sensor coil (a received signal). This received signal is delivered to a signal processing section via a receiving circuit, and the amplitude and phase of the received signal are analyzed.

The transmission and receiving operations of one sensor coil are repeated for each sensor coil in the same manner as previously mentioned by sequentially switching the plurality of sensor coils in the sensor section in the direction of position sensing. The operation of sequential switching of the sensor coils is called "scanning". The coordinate input apparatus is provided with a sensor coil changeover section, consisting of multiplexers or the like, for selecting the sensor coils, namely; switching the sensor coils. The switching, transmission and receiving actions of the sensor coil changeover section are controlled by a signal control section (not shown) of the coordinate input apparatus.

The position sensing process involves processes from the time when no coordinate data of the position indicator is obtained to the time when accurate coordinates (both X and Y) of the position indicator are calculated. ALL SCAN is first initiated for scanning all of the sensor coils in the sensor plane. ALL SCAN may be practically referred to as a ROUGH sensing process. A received signal distribution in the sensor section is obtained on the basis of a received signal from each sensor coil by means of ALL SCAN. When the position indicator is situated in a detectable range over the sensor plane, the received signal distribution shows the maximum value at the sensor coil that is closest to the position indicator. A group of several sensor coils substantially centered at the sensor coil that shows the maximum value must represent a peak of a signal intensity. In this way the approximate position of the position indicator can be determined. The position sensing process then proceeds to SECTOR SCAN. During the SECTOR SCAN, the previously mentioned transmission and receiving actions are repeated on the basis of a result of ALL SCAN with the use of the sensor coil showing a main peak value and the several sensor coils adjacent to that sensor coil. If the peak characteristics of the signal intensity are obtained again, the presence of the position indicator is verified. Calculation including interpolation is executed in the signal processing section, and a coordinate value of the position indicator is accurately determined. To obtain more accurate data, the SECTOR SCAN is usually repeated several times. The SECTOR SCAN can be practically referred to as a scrutinized sensing process.

The other position sensing methods comprises a method in which a position indicator receives an electromagnetic wave transmitted from a sensor plane; a simple electromagnetic action method in which the sensor plane receives an electromagnetic wave transmitted from the position indicator, in contrast to the preceding method. Moreover, there is a crossover sensing method in which an electromagnetic wave is transmitted from a sensor coil in an X axis direction and is received by a sensor coil in a Y axis direction. In addition to this, a self-oscillation type sensing method is also known such as disclosed in Unexamined Japanese Patent Publn. No. HEI-5(1993)-241722. In this self-oscillation type sensing method, sensor coils along the X axis and sensor coils along the Y axis are disposed of in such a way that a positive feedback loop is established between amplifiers respectively connected to a sensor coil along the X axis and a sensor coil along the Y axis; and as a result these sensor coils, both being never electromagnetically joined together are respectively electromagnetically coupled with a resonance circuit of a position indicator. The electromagnetic coupling between the position indicator and the sensor coils induces self-oscillation of the amplifiers, and a resulting oscillation signal is utilized in position sensing.

Detailed sensing processes of each of the previously mentioned position sensing methods differ from each other, and, even in one position sensing method, details will differ depending on embodiments thereof. However, the scanning of a group of sensor coils in the sensor section is common to all of the sensing methods.

For simplicity, in the descriptions of the above-mentioned position sensing methods, an explanation was only given of the processing of the maximum peak (hereinafter referred to as a main peak) of the intensity of a received signal in the received signal distribution. However, as disclosed in Examined Japanese Patent Publn. No. SHO-58(1983)-16506 and Unexamined Japanese Patent Publn. No. HEI-3(1991)-67320, in a position sensing method which uses a stylus pen type position indicator housing a coil or a resonance circuit and utilizes electromagnetic induction or electromagnetic coupling, a pair of sub-peaks on both sides of a main peak as well as the main peak are observed in a received signal distribution. The size of each of the pair of sub-peaks varies depending on a degree of inclination between the stylus pen and a sensor plane. This means that data of these sub-peaks can be variously utilized. For example, in the case of an inclined stylus pen where a coordinate value calculated from a main peak is shifted from an actual indicated position, it is possible to correct the error of the coordinate value by the utilization of intensity data of the pair of sub-peaks. It is also possible to use the intensity data of the sub-peaks in order to utilize the inclination of the stylus pen as data for indicating a specific operation. In practical calculation of inclination, data of the main peak as well as the data of the sub-peaks are also used.

If the data of the sub-peaks is utilized, precise sub-peak values are computed by subjecting sub-peaks to be utilized to calculation such as interpolation, similarly to the interpolation being carried out with respect to a main peak. Coordinate values corresponding to the precise subpeak values are also calculated, as required. For this reason, data from several sensor coils is required to execute interpolation calculation with respect to each of the subpeaks, and this is essential data. To obtain these data items, areas, including the main peak and the sub-peaks on both sides of the main peak, are scanned during the previously mentioned SECTOR SCAN.

FIG. 2 shows one process of conventional SECTOR SCAN (the drawing shows scanning only along the X axis or the Y axis). In FIG. 2, a selected group of sensor coils 10 to be scanned during SECTOR SCAN consist of sensor coils C-3, C-2, . . . C8, and C9. This case is based on the assumption that the largest value (a voltage value) of a received signal is obtained from the sensor coil C3 during ALL SCAN preceding the SECTOR SCAN. The length of a bar shown above each sensor coil in the chart shows a first-hand received signal value 20 obtained from each coil during SECTOR SCAN. Throughout similar charts, time changes from the left to the right in the charts.

In FIG. 2, a group of main-peak-selection sensor coils 10a, consisting of seven sensor coils from C0 to C6, are used in the interpolation calculation of a true peak value. As shown in the drawing, the maximum value of signals received from the group of seven main-peak-selection sensor coils 10 is an (initial) main peak value 20a obtained from the sensor coil C3. Interpolation calculation is carried out on the basis of the value obtained from this group of seven main-peak-selection sensor coils 10a, whereby a true main peak value 20a' is calculated.

The maximum value of signals received from a group of three left-sub-peak-selection sensor coils 10b is an (initial) left-sub-peak value 20b obtained from a sensor coil C-2. Interpolation calculation is executed on the basis of the value obtained from this group of three left-sub-peak-selection sensor coils 10b, whereby a true left sub-peak value 20b' is calculated.

The maximum value of signals received from a group of three right-sub-peak-selection sensor coils 10c is an (initial) right sub-peak value 20c obtained from a sensor coil C8. Interpolation calculation is carried out on the basis of the value obtained from this group of three right-sub-peak selection sensor coils 10c, whereby a true right sub-peak value 20c' is calculated.

The previously mentioned interpolation calculation based on the data obtained as a result of SECTOR SCAN during one process, and calculation of an inclination based on the data of the sub-peaks (a calculation routine 30 in FIG. 2) are usually executed every time one process of the SECTOR SCAN is completed. Results of the calculations are delivered to a data processing unit (a host machine). Ordinarily, dummy scanning which does not acquire data is carried out during a period of time required for these calculations.

As mentioned above, it is necessary for the conventional method to scan at least three sensor coils for each sub-peak in order to obtain a true sub-peak value by means of interpolation calculation. However, when both subpeaks as well as a main peak are received, it takes a longer time to scan the sensor coils if the number of sensor coils to be selected during SECTOR SCAN is large. In addition to this, the amount of data processing occurring as a result of the scanning will also increase, which in turn leads to an increased load on the signal processing section. This results in a drop in transfer rate of data to the host machine. Usually, SECTOR SCAN is repeated several times for one indicated position, and hence it is desirable to complete several SECTOR SCANS in as short a time as possible. This is attributable to the fact that an indicated position may change during the execution of the SECTOR SCAN and the calculation routine of the SECTOR SCAN if a position indicator moves at very rapidly. Moreover, in effect, SECTOR SCAN must be executed for both the X and Y axes, and a time difference evidently arises between when the SECTOR SCAN is carried out for the X axis and when the SECTOR SCAN is carried out for the Y axis. The indicated position may change during this time difference.

The method for utilizing the data of the sub-peaks also encounters another problem, that is, the problem of the edges of an effective area of the sensor section. As a matter of course, an effective area of the sensor section where a received signal becomes effective is limited. An area where only one of the sub-peaks can be sensed exists in the vicinity of each of the four sides of this limited area. Conventionally, a control section separates the flow of SECTOR SCAN when it becomes apparent that one of the subpeaks (a sub-peak on one side) juts out of the effective area as a result of ALL SCAN. Either of the following two types of SECTOR SCAN are executed. Specifically, if an outer sub-peak is out of the effective area, the outer sub-peak will not be scanned. If any one of the selection sensor coils for a main peak is outside the effective area, a group of selection sensor coils will be fixed to a group of a predetermined number of sensor coils from the end thereof. However, the more complex a conditional branch, the greater the load on the control section becomes, and therefore it takes longer. This results in a drop in the transfer rate of data to the host machine.

Thus, a scanning method which reduces the load on the control section as much as possible with respect to the edges of the effective area is desirable.

Conventionally, scanning is practiced only for one axis in only one direction (a forward direction) with respect to ALL SCAN as well as sector scan. However, strictly speaking, it is known that a received signal value of one sensor coil differs when scanning is carried out in a forward direction and when scanning is carried out in a reverse direction. This is ascribed to the following fact. Specifically, an induced voltage is developed in a resonance circuit, or the like, in the position indicator, by means of an electromagnetic wave transmitted from one sensor coil during one transmission period for the sensor coil. After a transmitted electromagnetic wave has been stopped, this induced voltage is progressively reduced during a receiving period. However, this induced voltage is not reduced completely to zero, and remains until the next sensor coil starts to transmit an electromagnetic wave. As a result of this, the residual induced voltage caused by the previous sensor coil is superimposed on an induced voltage caused by an electromagnetic wave from the subsequent sensor coil. In this way, the residual induced voltage caused by the previous sensor coil becomes an error of a received signal value of the subsequent sensor coil. The magnitude of this error depends on the magnitude of the induced voltage developed in the resonance circuit of the position indicator by means of the previous sensor coil.

For example, it is assumed that an original induced-voltage, developed in a resonance circuit or the like, in a position indicator by means of one sensor coil, is larger than an induced voltage caused by an adjacent sensor coil on the left side thereof, but is smaller than an induced voltage caused by an adjacent sensor coil on the right side thereof. Also, it is assumed that the direction of scanning from the left to the right is referred to as a forward direction. The one sensor coil is affected by a residual induced voltage from the left-side adjacent sensor coil when scanning is carried out in a forward direction, but is affected by a residual induced voltage from the right-side adjacent sensor coil when scanning is carried out in a reverse direction. Thus, a received signal value of the one sensor coil is Greatly affected by the scanning in a reverse direction compared with the scanning in a forward direction.

A practical aspect of the influence of the residual induced voltage on a received signal voltage is as follows: when there are no switching operations of the position indicator (namely; a frequency of a transmitted electromagnetic wave is matched with a resonance frequency of a resonance circuit, or the like), only an amplitude of the received signal voltage is substantially affected. Conversely, when there are switching operations of the position indicator (namely; the frequency of the transmitted electromagnetic wave is not matched with the resonance frequency of the resonance circuit, or the like), a phase difference arises, such that the received signal voltage is subjected to a more complex interference. Such an error of the received signal depending on the direction of scanning is negligible in ALL SCAN, which is intended to roughly obtain an indicated position, but the error is not negligible in SECTOR SCAN, which is intended to obtain an accurate indicated position.

To eliminate the influence of the residual induced voltage, the following means is provided in the prior art. Specifically, a table of corrected values, in which the magnitude of a residual induced voltage has been previously calculated, is prepared and stored in a memory or the like. A received signal value obtained during SECTOR SCAN is corrected by reading a corrected value, corresponding to a predetermined condition, from the memory. However, there is a problem that extensive use is made of the memory because the table of corrected values is stored in the memory.

Therefore, a method for eliminating the influence of the residual induced voltage, without the need of a large amount of a memory, is desired.

SUMMARY OF THE INVENTION

In view of the foregoing drawbacks of the prior art, the primary object of the present invention is to provide a scanning method, for use in a method for sensing a coordinate input apparatus, which reduces the number of selection sensor coils for a sub-peak, particularly during SECTOR SCAN, as much as possible.

The second object of the present invention is to provide a sensor coil scanning method, for use in a method for sensing a position of a coordinate input apparatus, which reduces loads on a control section and a signal processing section as much as possible.

The third object of the present invention is to provide a sensor coil SCAN method, for use in a method for sensing a position of a coordinate input apparatus, which eliminates the influence of a residual induced voltage depending on the direction of scanning of the sensor coil, without the need for a large amount of memory in a signal processing section.

In the first aspect of the present invention, in a coordinate sensing apparatus having a sensor section which forms a sensor plane and consists of a plurality of sensor coils arranged side by side along coordinate axes, and a position indicator housing at least a coil, a position sensing method which obtains at least a coordinate value of a position indicated by the position indicator and an inclination of the position indicator in relation to the sensor plane by the use of a value of a sensing signal including a main peak value and at least one sub-peak value, both being obtained from interactive action between the position indicator and a specified sensor coil of the group of sensor coils, wherein the position sensing method comprises a SECTOR SCAN step of carrying out scanning along one specific coordinate axis of the coordinate axes to obtain at least (1) sensing signal from a group of main-peak selection coils including a main sensor coil which provides the main peak value and at least the number of sensor coils required for calculating the coordinate value by means of interpolation calculation, (2) a first sensing peak value from a first sub-sensor coil which provides a first sub-peak value on the left side of the main peak value with respect to the specific coordinate axis, and (3) a second sensing peak value from a second sub-sensor coil which provides a second sub-peak value on the right side of the main peak value with respect to the specific coordinate axis; and a calculation step of, calculating the coordinate value by means of interpolation calculation using the sensing signals obtained from the group of main-peak selection sensor coils, and also calculating the inclination using the first sensing peak value obtained from the first sub-sensor coil and the second peak value obtained from the second sub-sensor coil, at the time of sector scanning.

The SECTOR SCAN step may include scanning of a group of selection sensor coils in one direction along the specific coordinate axis, the group of selection sensor coils comprising (1) a group of main-peak selection sensor coils containing a main sensor coil which provides the main peak value, and at least the number of sensor coils required for calculating the coordinate value by means of interpolation calculation;

(2) a first sub-sensor coil which provides a first sub-peak value on the left side of the main peak value with respect to the direction of scanning; and (3) a second sub-sensor coil which provides a second sub-peak value on the right side of the main peak value with respect to the direction of scanning.

The SECTOR SCAN step may include a first step of scanning a group of first selection sensor coils in one direction along the specific coordinate axis, the first selection sensor coil group comprising (1) a group of main-peak selection sensor coils containing a main sensor coil which provides the main peak value, and at least the number of sensor coils required for calculating the coordinate value by means of interpolation calculation, and (2) a first sub-sensor coil which provides a first sub-peak value, and a second step of scanning a group of second selection sensor coils in one direction along the specific coordinate axis, the second selection sensor coil group comprising (1) a group of main-peak selection sensor coils containing a main sensor coil which provides the main peak value, and at least the number of sensor coils required for calculating the coordinate value by means of interpolation calculation, and (2) a second sensor coil which provides a second sub-peak value; and wherein the calculation step includes, the steps of calculating the coordinate value by means of interpolation calculation using sensing signal obtained from the group of main-peak selection sensor coils, and calculating the inclination using the most recent sensing peak value obtained from the first sub-sensor coil and the most recent sensing peak value obtained from the second sub-sensor coil.

The SECTOR SCAN step may include a first step of scanning, in one direction along the specific coordinate axis, (1) a group of main-peak selection sensor coils containing a sensor coil which provides the main peak value, and at least the number of sensor coils required for calculating the coordinate value by means of interpolation calculation, and (2) a first sub-sensor coil which provides a first sub-peak value, (3) a second sub-sensor coil which provides a second sub-peak value, and a second step of scanning the group of selection sensor coils in a reverse direction with respect the direction of scanning in the first step; and wherein the calculation step includes, the steps of calculating temporary coordinate values respectively in the first and second steps by means of interpolation calculation, using sensing signals obtained from the group of main-peak selection coils, calculating the coordinate value by averaging the two most recent temporary coordinate values, and calculating the inclination using the most recent sensing peak value obtained from the first sub-sensor coil and the most recent sensing peak value obtained from the second sub-sensor coil.

The SECTOR SCAN step may include a first step of scanning, in one direction along the specific coordinate axis, a group of first selection sensor coils comprising (1) a group of main-peak selection sensor coils containing a sensor coil which provides the main peak value, and at least the number of sensor coils required for calculating the coordinate value by means of interpolation calculation, and (2) a first sub-sensor coil which provides a first sub-peak value, a second step of scanning the group of first selection sensor coils in a reverse direction with respect to the direction of scanning in the first step, a third step of scanning, in one direction along the specific coordinate axis, a group of second selection sensor coils comprising (1) a group of main-peak selection sensor coils containing a sensor coil which provides the main peak value, and at least the number of sensor coils required for calculating the accurate coordinate value by means of interpolation calculation, (2) a second sub-sensor coil which provides a second sub-peak value, and a fourth step of scanning the group of second sensor coils in a reverse direction with respect to the direction of scanning in the third step; and wherein the calculation step includes the steps of, the steps of calculating temporary coordinate values respectively in the first to fourth steps, using sensing signals obtained from the group of main-peak selection coils, calculating the coordinate value by averaging the two most recent temporary coordinate values, and calculating the inclination using the most recent sensing peak value obtained from the first sub-sensor coil and the most recent sensing peak value obtained from the second sub-sensor coil.

The SECTOR SCAN step may include first to fourth steps, each step having the steps of scanning, in one direction, or in a reverse direction thereto, along the specific coordinate axis, a group of main-peak selection sensor coils containing a sensor coil which provides the main peak value, and at least the number of sensor coils required for calculating the coordinate value by means of interpolation calculation, and scanning, along the specific coordinate axis, either a first sub-sensor coil which provides the first sub-peak value or a second sub-sensor coil which provides the second sub-peak value; and wherein the calculation step includes, the steps of calculating temporary coordinate values respectively in the first to fourth steps, using sensing signals obtained from the group of main-peak selection sensor coils, calculating the coordinate value by averaging the most recent temporary coordinate value obtained as a result of the scanning in one direction and the most recent temporary coordinate value obtained as a result of the scanning in a reverse direction, and calculating the inclination using the most recent sensed peak value obtained from the first sub-sensor coil and the most recent sensed peak value obtained from the second sub-sensor coil.

The each of the first to fourth steps of the SECTOR SCAN step may carry out scanning of either the first subsensor coil or the second sub-sensor coil before the group of main-peak selection sensor coils.

The order of the first to fourth steps of the SECTOR SCAN step may be set in such a way that the group of main-peak selection sensor coils are alternately scanned in one direction and in a reverse direction, and that the first and second sub-sensor coils are alternately scanned.

When at least the group of main-peak selection sensor coils are present in an effective area in the sensor plane but some of the remaining sensor coils are out of the effective area of the sensor plane during SECTOR SCAN, the scanning may be carried out by selecting one or a plurality of other sensor coils located in the effective area instead of the sensor coils located out of the effective area.

The selected sensor coil or coils are selected from a region along one edge of the effective area which may be on the opposite side to the specific coordinate axis.

When either the first sub-sensor coil or the second sub-sensor coil is situated out of the effective area, the inclination may be calculated by the use of only a sensed peak value obtained as a result of the scanning of either the first sub-sensor coil or the second sub-sensor coil situated in the effective area.

The main peak value and the first and second sub-peak values, which sector scanning is based on, may be obtained by ALL SCAN which roughly scans the entire sensor plane.

When the coordinate value and the inclination of the moving position indicator may be calculated by repeating SECTOR SCAN, the main peak value and the first and second sub-peak values on which the present SECTOR SCAN is based on are obtained by SECTOR SCAN just prior to the present SECTOR SCAN.

When the first sub-sensor coil is scanned in the SECTOR SCAN step, the at least sensor coil adjacent to the first sub-sensor coil may be also scanned; and when the second sub-sensor coil is scanned in the SECTOR SCAN step, the at least sensor coil adjacent to the second sub-sensor coil may be also scanned.

The coil adjacent to either the first sub-sensor coil or the second sub-sensor coil may be scanned before the first sub-sensor coil or the second sub-sensor coil.

The calculated coordinate value may be used in calculating the inclination in the calculation step.

When the main peak value and the first and second sub-peak values on which SECTOR SCAN is based are obtained by ALL SCAN which roughly scans the entire sensor plane, both the first sub-sensor coil and the second sub-sensor coil may be scanned in only the first step of the SECTOR SCAN step; the coordinate value may be calculated by interpolation calculation using a sensed signal obtained from the group of main-peak selection sensor coils; and the inclination may be calculated by the use of two sensed peak values obtained from the first and second sub-sensor coils.

When the main peak value and the first and second sub-peak values on which SECTOR SCAN is based are obtained by ALL SCAN which roughly scans the entire sensor plane, both the first sub-sensor coil and the second sub-sensor coil may be scanned in only the first step of the SECTOR SCAN step; the coordinate value may be calculated by interpolation calculation using a sensed signal obtained from the group of main-peak selection sensor coils; and the inclination may be calculated by the use of two sensed peak values obtained from the first and second sub-sensor coils.

If at least the group of main-peak selection coils are situated in an effective area in the sensor plane but a part of the remaining coils exist outside the effective area when the SECTOR SCAN step is carried out, the SECTOR SCAN may be carried out by taking a predetermined number of sensor coils, arranged along a border edge between the effective area and the outside of the effective area, as a group of selection sensor coils; a sensed signal value indicated by a sensor coil, spaced apart from a sensor coil of the group of selection sensor coils showing a main peak value by a predetermined number which is smaller than the predetermined number, as a sensed peak value from a sub-sensor coil; and the inclination may be calculated by the use of only the sensed peak value.

The SECTOR SCAN step and the calculation step may be carried out, in order, with respect to a plurality of specific coordinate axes.

The SECTOR SCAN step and the calculation step with respect to a plurality of specific coordinate axes may be subjected to time division and parallel processing .

In the first and second constructions, at least one sub-peak selection coil is enough for each side. Therefore, the number of sub-peak selection sensor coils is reduced, and the number of all of the selection sensor coils is eventually reduced. As a result of this, the number of selection of the sensor coils is reduced, therefore the time required for SECTOR SCAN is reduced. Interpolation calculation for obtaining a true sub-peak value is not carried out with respect to the sub-peak value, and a sensed sub-peak value is directly used in calculating an inclination. This results in facilitated calculation processing as well as a reduced calculation time. For this reason, a rate of transmission of data to a host machine is improved.

In the third construction, one SECTOR SCAN step consists of two stages. In each stage, only one of the left and right sub-peak selection sensor coils is scanned together with the main-peak selection sensor coil, and hence the time for scanning in one stage is reduced. Moreover, a sensed sub-peak value is directly used in the calculation of an inclination, and calculation time is reduced. Results of calculation of the coordinate value and the inclination are fed to the host machine for each step, and hence the rate of transmission of data to the host machine is improved.

In the fourth construction, one SECTOR SCAN step consists of two stages, the directions of scanning are alternately switched between a forward direction and a reverse direction for each stage. In the calculation processing, temporary coordinate values obtained respectively for the directions of scanning are averaged, whereby a coordinate value is calculated. As a result of this, it is possible to cancel errors caused by a residual induced voltage which occurs when an induced voltage is used in sensing.

In the fifth construction, one SECTOR SCAN step consists of four stages. Scanning, including a left subpeak, is carried out in both forward and reverse directions in the first half two stages, and scanning including a right sub-peak a right sub-peak is carried out in both forward and reverse directions in the latter half two stages. In calculation processing, each temporary coordinate value in each direction of SCAN is averaged. Thereby, the required time in one stage of the SECTOR SCAN is reduced, and errors caused by a residual induced voltage are cancelled.

In the sixth construction, one SECTOR SCAN step consists of four stages. Each scanning step is formed by a selection as to whether the group of main-peak selection coils are scanned in a forward direction or in a reverse direction, whether the group of sub-peak selection sensor coils are made to have a left sub-peak or a right sub-peak and by the combination of the direction of scanning and the subpeak of the sub-peak selection sensor coil. As a result of this, the required time in the first step of the SECTOR SCAN is reduced, as well as errors caused by a residual induced voltage being cancelled.

In the seventh construction, the group of sub-peak selection sensor coils are scanned prior to the scanning of the group of main-peak selection sensor coils in one scanning step of the SECTOR SCAN. This results in superior tracking of a sensed coordinate value with respect to the movement of the position indicator.

In the eighth construction, the directions of scanning of the group of main-peak selection sensor coils in the sixth and seventh constructions are alternately selected, and the right and left of the sub-peak selection sensor coils are alternately selected. This makes it possible to minimize a difference between a plurality of sensed values, to be used in one calculation processing, occurring when they were sensed. Hence, a scanning method having superior tracking with respect to the movement of the position indicator is obtained.

In the ninth construction, if a part of the group of selection sensor coils which must carry out SECTOR SCAN jut out of the effective area of the sensor plane, another sensor coil in the effective area will be tentatively taken as the selection sensor coil, and ordinary SECTOR SCAN will be carried out. As a result of this, an excess conditional branch or processing provided before the SECTOR SCAN becomes unnecessary.

In the tenth construction, the tentatively selected selection sensor coil in the ninth construction is obtained from a region close to the opposing edges of the effective area. Since the tentative selection sensor coil is not a sensor coil for acquiring data, it is ideal that the tentative selection sensor coil is not affected by a substantial sensing action at all. Accordingly, it is possible to select a tentative selection sensor coil from a region which is most distant from the area where the substantial sensing action takes place.

In the eleventh construction, even if only a sub-peak value on one side of both sub-peak values is substantially obtained, it is possible to calculate an inclination by the use of only a sub-peak value on one side.

In the twelfth construction, the group of selection sensor coils to be scanned during the SECTOR SCAN can be determined on the basis of a result of ALL SCAN operation.

In the thirteenth construction, the group of selection sensor coils to be scanned during SECTOR SCAN can be determined on the basis of a result of the SECTOR SCAN immediately before this SECTOR SCAN.

In the fourteenth construction, sensor coils which will be skipped during scanning are prevented by selecting sub-peak selection sensor coils. This results in a reduced load on the control section.

In the fifteenth construction, a sensor coil which actually provides a sub-peak value is prevented from being scanned in one scanning step of the SECTOR SCAN. This is attributable to the fact that a sensed signal value obtained from a sensor coil which is first scanned includes errors caused by a rise characteristic of a coil housed in the position indicator, and hence it is not suitable for data. As a result of this, an inclination calculated on the basis of a sub-peak value becomes more accurate.

In the sixteenth construction, the accuracy of the inclination is improved by taking into account a coordinate value at the time of calculation of the inclination.

In the seventeenth construction, if only a sub-peak value on one side only is obtained in one scanning step during the SECTOR SCAN, sub-peak selection sensor coils on both sides will be exceptionally scanned so as to obtain subpeak values on both sides in only the first scanning step. As a result of this, it is possible to calculate an inclination using sub-peak values on both sides even in the first step.

In the eighteenth construction, if a part of the group of selection sensor coils which must execute SECTOR SCAN jut out of the effective area of the sensor plane, the group of selection sensor coils will be fixed to a predetermined number of sensor coils from the edge of the effective area, and a sensed signal value shown by a sensor coil spaced apart, by an equal distance, from the sensor coil which indicates a main peak value will be taken as a sub-peak value. As a result of this, even if the group of selection sensor coils are fixed, a sub-peak which moves along with the movement of the main peak can be correctly sensed.

In the nineteenth and twentieth constructions, it is possible to minimize a difference in measuring time between an X coordinate axis and a Y coordinate axis.

According to the position sensing method for use in a coordinate input apparatus of the present invention, data is obtained only from one sensor coil which shows the maximum value of a right sub-peak and one sensor coil which shows the maximum value of a left sub-peak particularly during SECTOR SCAN in which sub-peak selection sensor coils on both sides of a main-peak selection sensor coil as well as the main-peak selection sensor coil are scanned. By virtue of this configuration, the number of sub-peak selection sensor coils is reduced, and the times required for SECTOR SCAN and the time for calculating an inclination are also reduced. Loads on a control section and a signal processing section, which are relevant to switching control of sensor coils, transmission/receiving control and processing of a received signal, or the like, are reduced. Moreover, a rate of transfer of data to a host machine is improved.

The SECTOR SCAN in the position sensing method of the present invention realizes scanning in both directions, that is, in a forward direction and in a reverse direction in order to obtain a main peak in addition to scanning to obtain both sub-peaks. Furthermore, such scanning in both directions is effected without decreasing a rate of transfer of data to the host machine. Additionally, in calculation processing, it is possible not only to execute simple averaging calculation but also to cancel errors of coordinate values caused by a residual induced voltage. As a result of this, more accurate coordinate values are obtained. An inclination is usually calculated as a function of each piece of data obtained from both sub-peaks and a main peak, and hence an accurate inclination is obtained.

DESCRIPTION OF THE PREFERRED EMBODIMENTS

With reference to the accompanying drawings, preferred embodiments of the present invention will now be described in detail.

In each of embodiments shown in FIGS. 3 through 8, for simplicity, sensor coils only along one axis, i.e., an X axis or a Y axis are shown. However, sensor coils along the other axis are also shown similarly.

Figure 3:
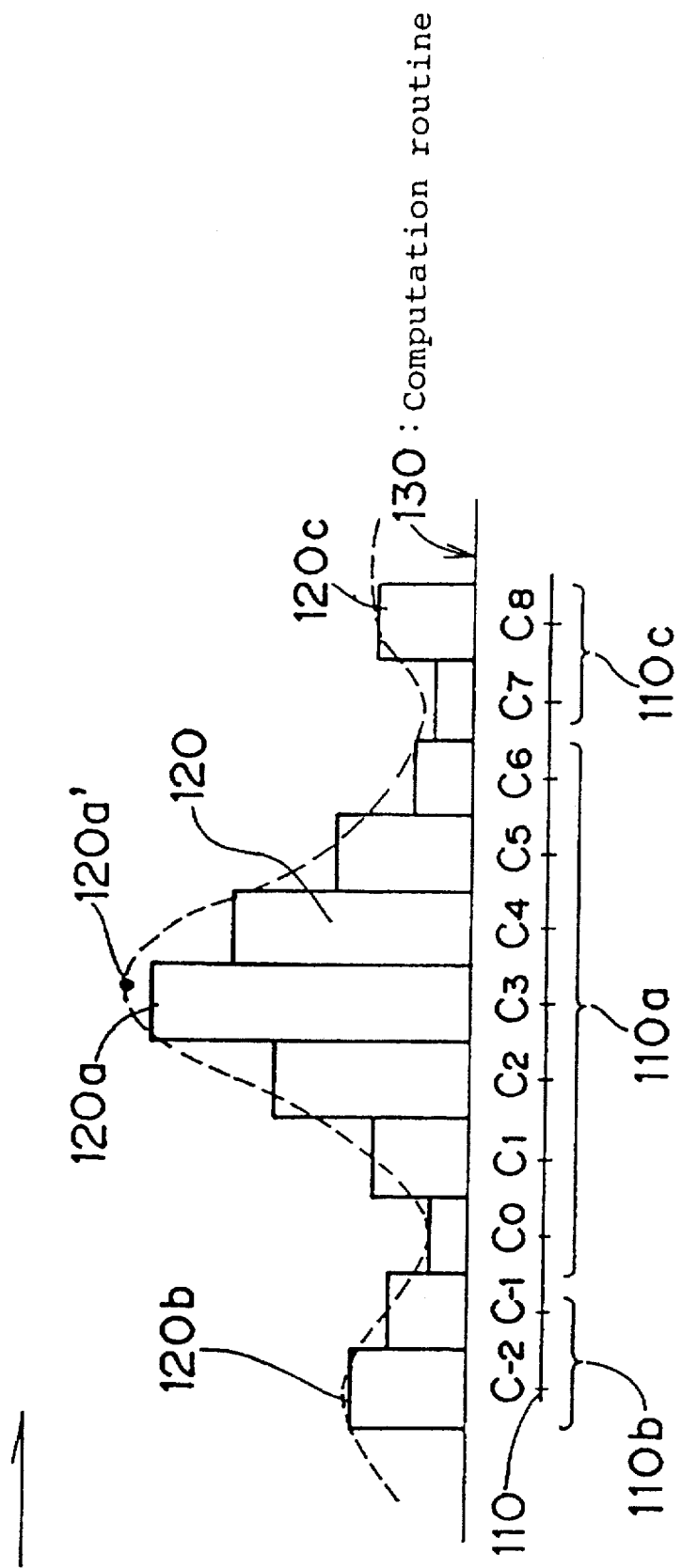
FIG. 3 is a chart showing a sensor coil scanning method for use in sector scan in a first embodiment of the position sensing method for a coordinate input apparatus according to the present invention.

FIG. 3 is a chart showing a sensor coil scanning method for use in SECTOR SCAN in a first embodiment of a position sensing method for a coordinate input apparatus according to the present invention. FIG. 3 shows one process of SECTOR SCAN. On the assumption that from left to right in the drawing is a forward direction, a group of two left-subpeak selection sensor coils 110b, a group of seven main-peak selection sensor coils 110a, and a group of two right-subpeak selection sensor coils 110c are scanned, in that order, in a forward direction. In regard to the group of main-peak selection sensor coils 110a, seven sensor coils centered on a sensor coil C3, from which a main peak value 120a was obtained as a result of all-scanning operation, are selected in the same manner as in a conventional method.

The feature of the present invention resides in that interpolation calculation is not carried out with respect to sub-peak values. Specifically, in the present invention, the sensor coils C-2 and C8, from which sub-peak values 120b and 120c were respectively obtained as a result of all-scanning operation, are taken as the groups of sub-peak selection sensor coils 110b and 110c during the SECTOR SCAN. The left sub-peak value 120b and the right sub-peak value 12c, respectively obtained from the sensor coils C-2 and C8, are directly used as true sub-peak values during the SECTOR SCAN. In this way, according to the present invention, all that is needed is basically to scan one right sub-peak selection sensor coil and one left sub-peak selection sensor coil.

However, in practice, a sensor coil C-1 is added to the sensor coil C-2, and a sensor coil C7 is added to the sensor coil C8. Eventually, two sub-peak selection sensor coils are scanned for each side. The sensor coil C-1 and the sensor coil C7 are used in only the transmission and receiving of an electromagnetic wave, and they are not used in calculation. The scanning of two sub-peak selection sensor coils on each side is actually attributable to the stabilization of a received signal and the facilitation of control. In connection with the stabilization of a received signal, it takes a little time until an induced voltage of a resonance circuit, or the like, in a position indicator rises, and therefore data from a sensor coil, which first carried out transmission or receiving, contains a slight error. Accordingly, it is desirable for a sensor coil which acquires data to be different from the first sensor coil used in one process of SECTOR SCAN. In other words, a sensor coil scanned after the resonance circuit has been stabilized, (after a received signal has been stabilized) acquires more stable data compared with the first scanned sensor coil (see fourth and sixth embodiments which will be described later). In connection with the facilitation of control, in view of the control of scanning of a sensor coil, processing of continuous scanning is simpler when compared with processing of scanning which skips specific sensor coils, and therefore the control section experiences a smaller load (see the first embodiment, and a second embodiment, a third embodiment, and a fifth embodiment which will be described later).

In the first embodiment shown in FIG. 3, a calculation routine 130 is executed every time one process of SECTOR SCAN is completed, and a result of the calculation is fed to a host machine. The calculation routine 130 determines a true main peak value 120a' and a coordinate value thereof by means of interpolation calculation. An inclination is also calculated from the left sub-peak value 120b and the right sub-peak value 120c by means of a predetermined calculation of an inclination.

Figure 1:
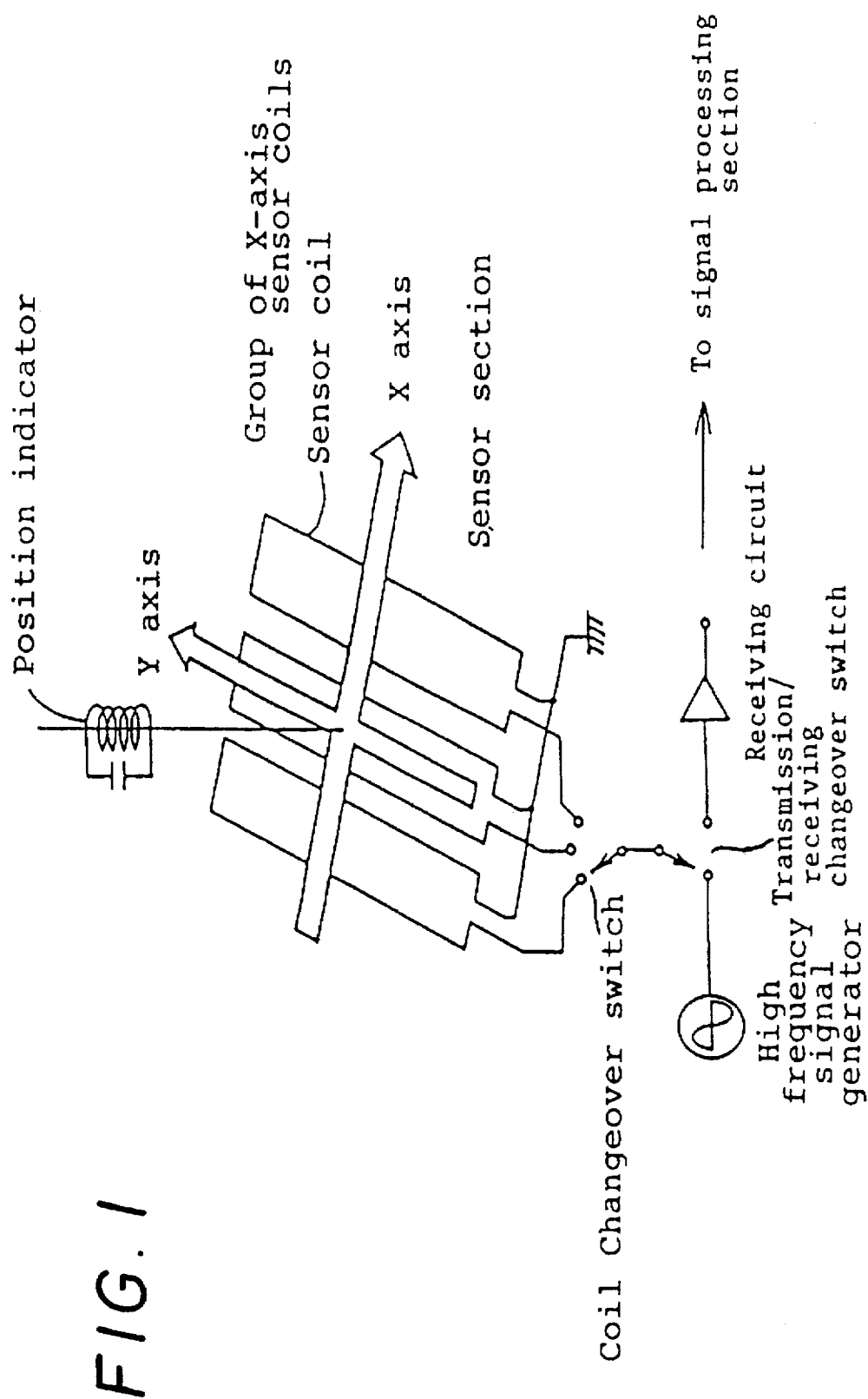
FIG. 1 is a schematic block diagram for illustrating the principle operation of an ordinary coordinate input apparatus which uses the electromagnetic transfer method.
Figure 2:
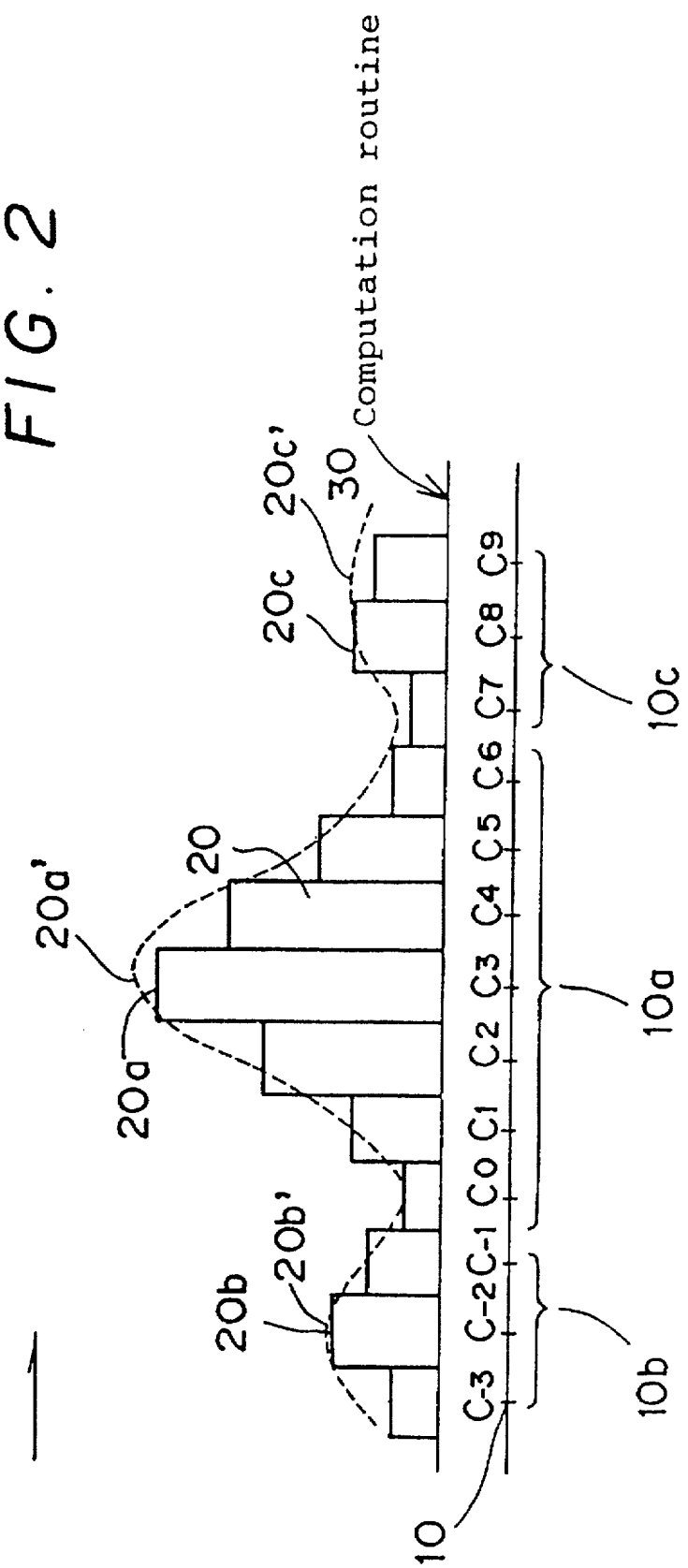
FIG. 2 is a chart showing one process of a conventional sector scan in a position sensing method for use in a coordinate input apparatus.

When the first embodiment shown in FIG. 3 is compared with the conventional example shown in FIG. 2, the number of sub-peak selection sensor coils is reduced from three to two for each side. Moreover, in the first embodiment, it is basically possible to use only one sub-peak selection sensor coil for each side, as previously mentioned. Compared with the conventional example, the number of sub-peak selection sensor coils can be significantly reduced. In addition, the present invention does not require interpolation in order to obtain true sub-peak values, and hence the calculation routine is facilitated, and a calculation time is also reduced.

Figure 4:
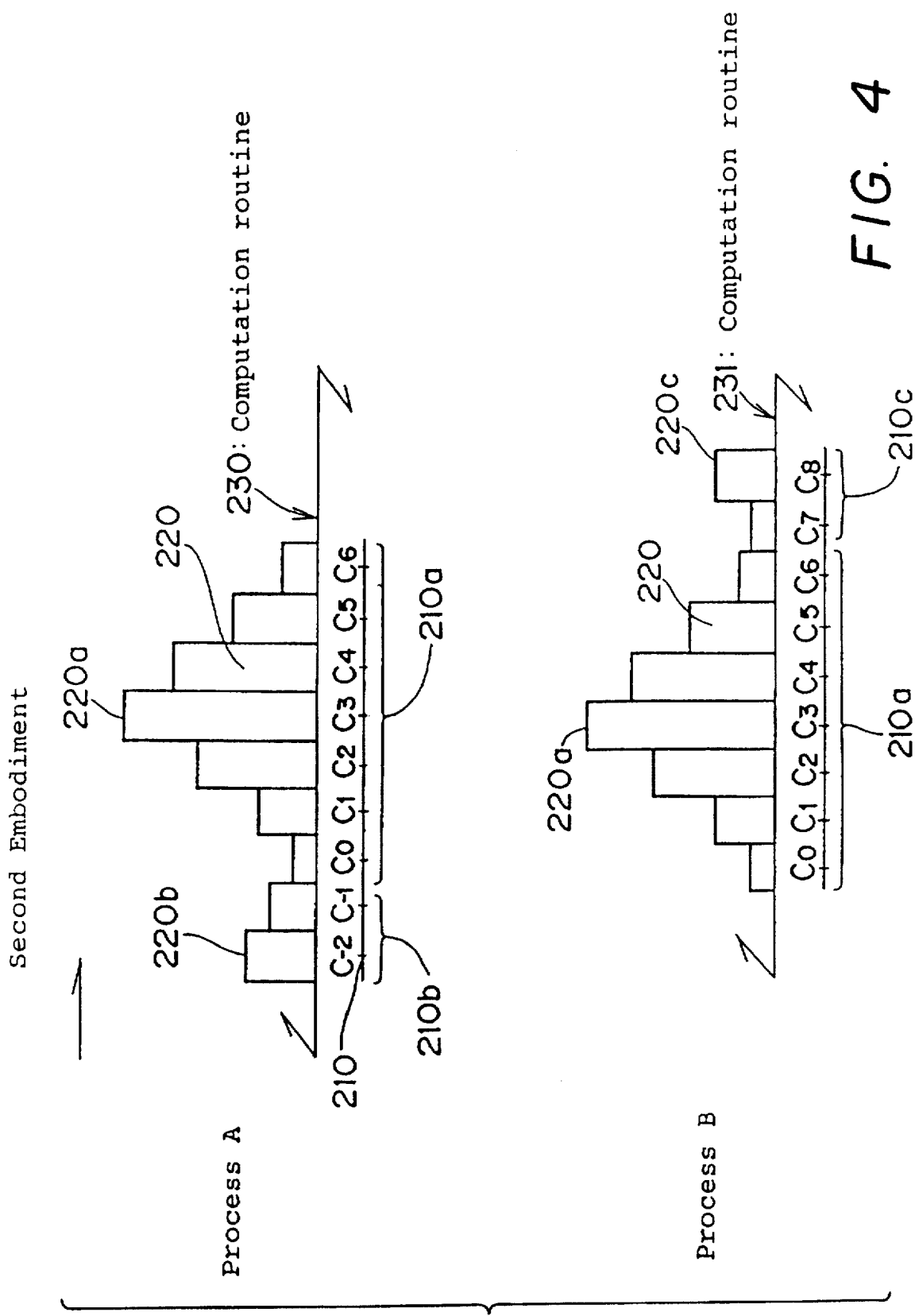
FIG. 4 is a chart showing the sensor coil scanning method for use in SECTOR SCAN in a second embodiment of the position sensing method for a coordinate input apparatus according to the present invention.

FIG. 4 is a chart showing the sensor coil scanning method in a second embodiment of the position sensing method for a coordinate input apparatus. FIG. 4 shows two successive processes. A process A and a process B shown in the drawing are alternately repeated. Even in this second embodiment, the group of seven main-peak selection sensor coils 210a centered on the sensor coil C3 which indicates a main peak value 220a are scanned with respect to the main peak in the same manner as in the conventional example. The group of main-peak selection sensor coils 210a are scanned in processes A and B. In the second embodiment, the group of left sub-peak selection sensor coils 210b, consisting of two sensor coils C-2 and C-1, are scanned in process A. The group of right sub-peak selection sensor coils 210c, consisting of two sensor coils C7 and C8, are scanned in process B. As with the first embodiment, even in the second embodiment, only the sub-peak selection sensor coils C-2 and C8 acquire data, and a left sub-peak value 220b and a right sub-peak value 220c respectively obtained from these sensor coils are used instead of true sub-peak values. Therefore, it is possible to omit the scanning of the sensor coils C-1 and C7 (in other words, it is possible to skip them without scanning).

In the second embodiment shown in FIG. 4, a calculation routine 230 is executed every time process A is completed, and a result of the calculation is fed to the host machine. In the same manner, a calculation routine 231 is executed every time process B is completed, and a result of the calculation is fed to the host machine. By means of the calculation routines 230 and 231, true main peak values (not shown) and coordinate values thereof are determined by interpolation. An inclination is also calculated by each calculation routine. In the case of the calculation routine 230, an inclination is calculated from the left sub-peak value 220b obtained in the illustrated process A and the right sub-peak value obtained in process B (not shown) before process A. In the case of the calculation routine 231, an inclination is calculated from the left sub-peak value 220b obtained in the illustrated process A and the right sub-peak value 220c obtained in the illustrated process B. In this way, in the second embodiment, one of the right and left subpeak values is obtained in one process, and the other subpeak value is obtained in the subsequent process. Thus, the left and right sub-peak values are alternately obtained for each process. For this reason, there is a time difference, equivalent to one process, between the data of both sub-peak values used in the calculation of an inclination, and therefore tracking, with respect to the inclination of the position indicator, is slightly decreased. However, the number of sensor coils which are scanned in one process of SECTOR SCAN in the first embodiment is eleven, but the number of the scanned sensor coils in the second embodiment is nine. Accordingly, scan time is reduced. The calculation routine 130 in the first embodiment and the calculation routine 230 in the second embodiment are completely the same, and therefore both routines require the same time. In this way, the rate (frequency) of transmission of data to the host machine in the second embodiment is faster (or more frequent) than that in the first embodiment.

In the second embodiment, it is impossible to execute the ordinary calculation of an inclination because only one sub-peak value is obtained after the completion of the first process of SECTOR SCAN. Differing from a subsequent process which follows the calculation of the inclination, only the first process is subjected to special processing. This special processing will be described later in detail with reference to FIGS. 11 to 12.

Figure 5:
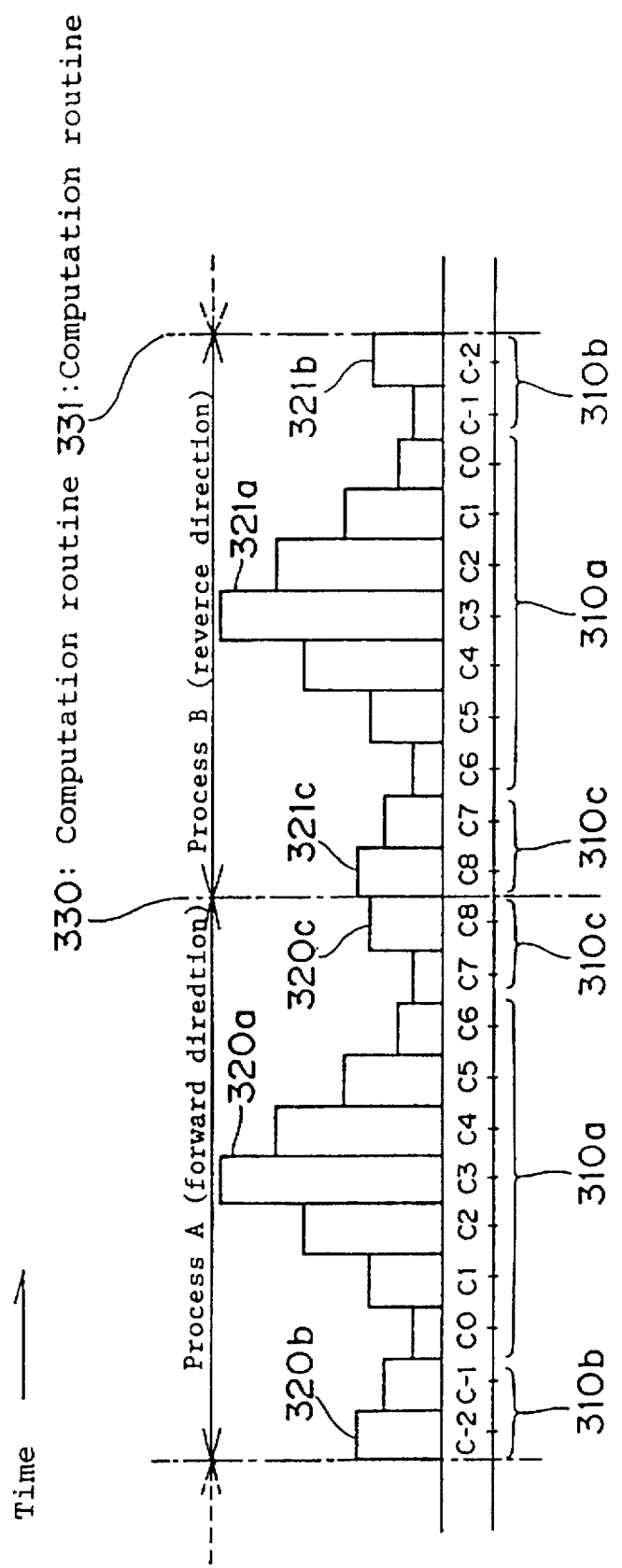
FIG. 5 is a chart showing the sensor coil scanning method for use in SECTOR SCAN in a third embodiment of the position sensing method for a coordinate input apparatus according to the present invention.

FIG. 5 shows the sensor coil scanning method for use in SECTOR SCAN in a third embodiment of the position sensing method for a coordinate input apparatus according to the present invention. FIG. 5 shows two successive processes in SECTOR SCAN, and illustrated processes A and B are alternately repeated. Process A (in a forward direction) is the same as the process of the first embodiment, whilst process B scans the group of sensor coils scanned in process A in a reverse direction. In other words, in process A, a group of two left sub-peak selection sensor coils 310b, a group of seven main-peak selection sensor coils 210a, and a group of two sub-peak selection sensor coils 310c are scanned. In process B, the three groups of sensor coils are scanned in a reverse direction. Even in the third embodiment, only the sub-peak selection sensor coils C-2 and C8 acquire data, left and right sub-peak values 320b and 320c, respectively obtained from the sub-peak sensor coils C2 and C8, are directly used instead of true sub-peak values. Hence, it is possible to omit the sensor coils C-1 and C7.

Even in the third embodiment, a calculation routine 330 is executed every time process A (in a forward direction) is completed, and a result of the calculation is fed to the host machine. Calculation routines 330 and 331 are different from the calculation routines in the first and second embodiments previously mentioned, in that the calculation routines 330 and 331 include calculation to correct an influence of a residual induced voltage which depends on the previously mentioned direction of scanning. In the case of the scan in a reverse direction, the influence of the residual induced voltage appears in the opposite direction to the direction in which the influence appears in the case of the scan in a forward direction. For this reason, it is possible to cancel an error by averaging the data obtained as a result of scanning in both directions. In effect, it is not necessary to correct the error by the use of received signals obtained as a result of scan in both directions. Each temporary coordinate value for scan in each direction is first calculated by an ordinary calculation routine, and it is possible to cancel a difference in coordinate value by simply averaging the obtained coordinate values. The cancellation of the error is effective irrespective of the presence or absence of switching operations of the position indicator.

Therefore, in the calculation routine 330 of process A shown in FIG. 5, after a true main peak value (not shown), and a coordinate value and an inclination thereof have been calculated, a temporary coordinate value calculated in process A and a temporary coordinate value calculated in process B (not shown) which precedes process A are averaged and calculated. Thereafter, a true coordinate value obtained as a result of averaging is sent to the host machine together with the inclination data. In the calculation routine 331 of process B shown in FIG. 5, after a true main peak value (not shown), and a coordinate value and an inclination thereof have been calculated, a coordinate value calculated in process B and the temporary coordinate value, which is obtained in process A and is not yet averaged, are averaged and calculated. Thereafter, a true coordinate value obtained as a result of averaging is sent to the host machine together with the inclination data.

Figure 6:
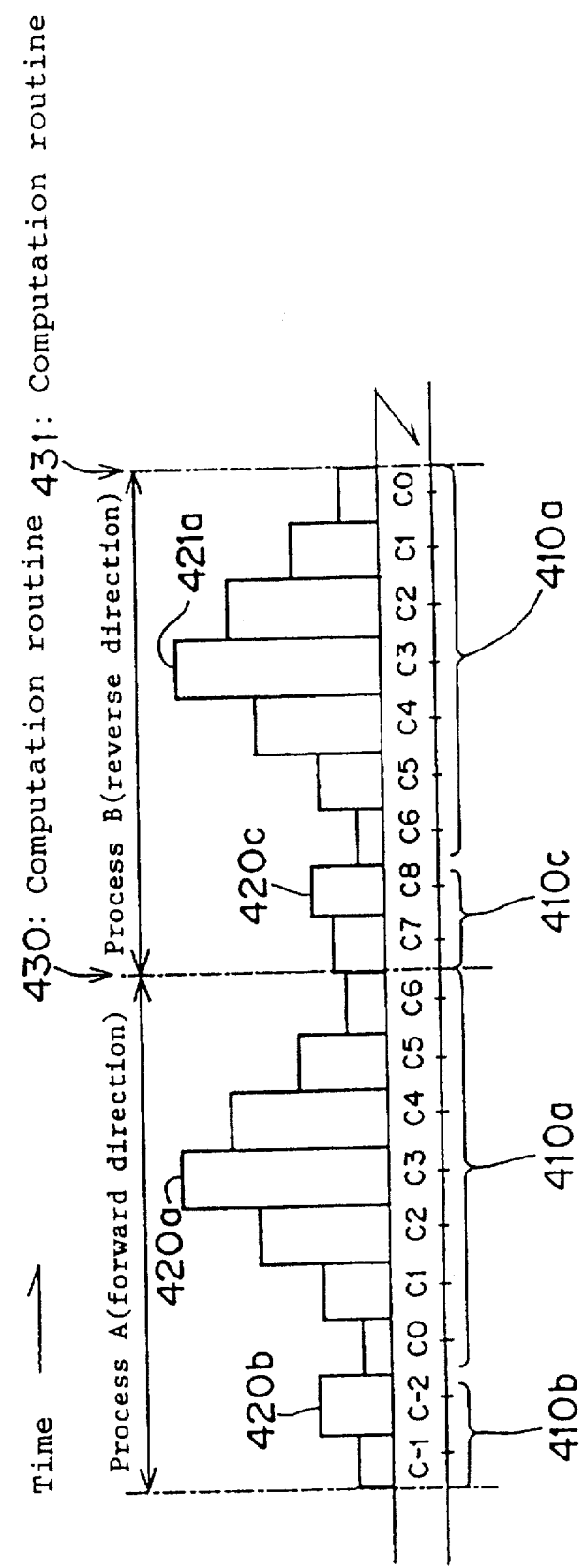
FIG. 6 is a chart showing the sensor coil scanning method for use in SECTOR SCAN in a fourth embodiment of the position sensing method for a coordinate input apparatus according to the present invention.

FIG. 6 shows the sensor coil scanning method for use in SECTOR SCAN in a fourth embodiment of the position sensing method for a coordinate input apparatus. The fourth embodiment is the most simple example in which the scanning method for alternately scanning left and right sub-peak values (for example, the second embodiment) and a scanning method for alternately scanning in a forward direction and a reverse direction (for example, third embodiment) are combined together. In the fourth embodiment, the directions of scanning of a group of selection sensor coils, that is, the scanning of the sensor coils in a forward direction and a reverse direction, and the order of scanning of a group of right and left sub-peak selection sensor coils are alternately switched for each process. Hence, the SECTOR SCAN in this embodiment consists of repetition of the illustrated processes A and B.

In the fourth embodiment, particularly, right and left sub-peak values used in the calculation of an inclination in calculation routines 430 and 431 are sub-peak values obtained in the present process and the preceding process. Therefore these data items have a superior accuracy of inclination because there is little time difference between these data items (for example, in fifth and sixth embodiments which will be described later, in some case, both sub-peak values are obtained from the present process and the process before the preceding process).

Figure 7:
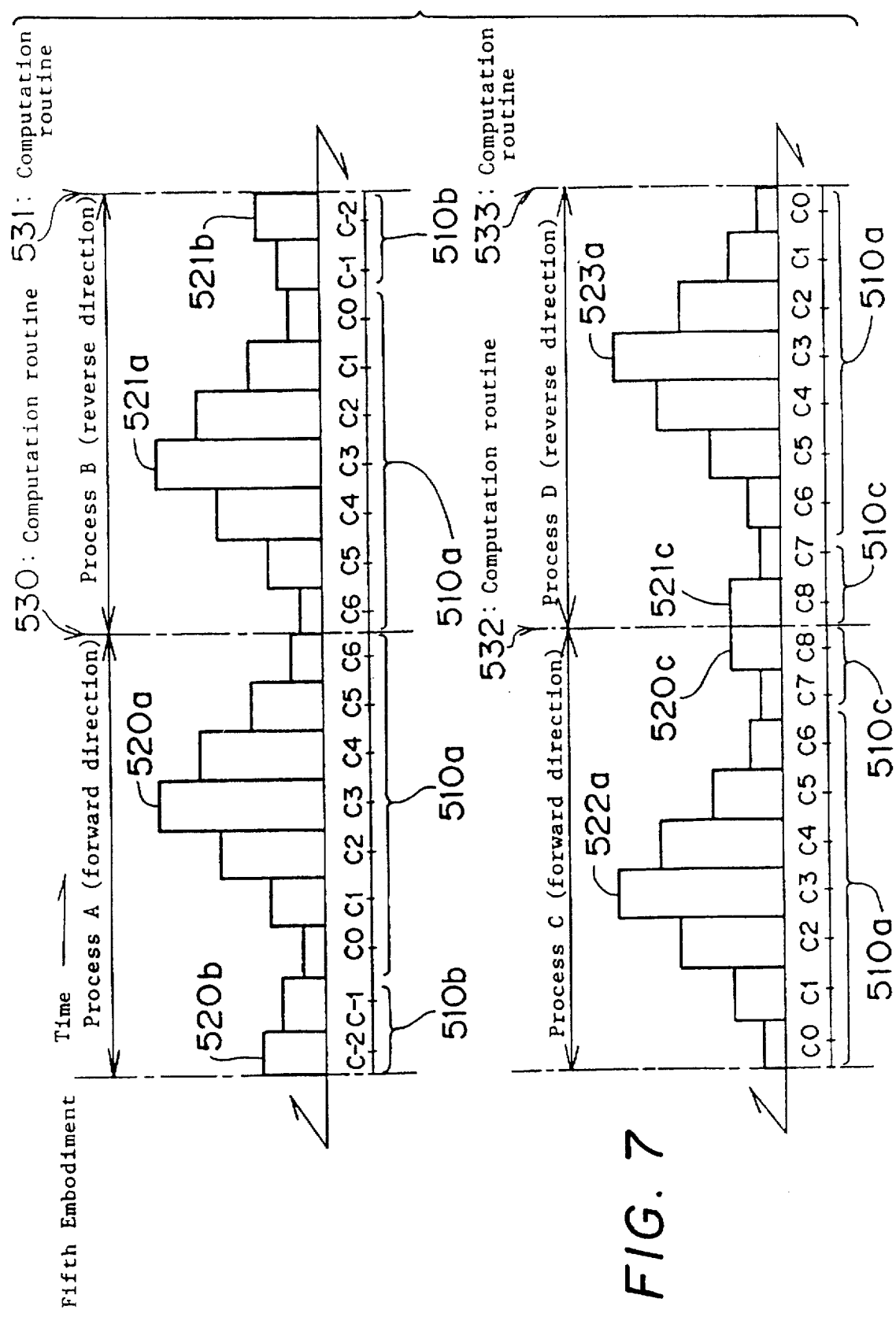
FIG. 7 is a chart showing the sensor coil scanning method for use in SECTOR SCAN in a fifth embodiment of the position sensing method for a coordinate input apparatus according to the present invention.

FIG. 7 shows a fifth embodiment which is one example to which the fourth embodiment is applied. In FIG. 7, SECTOR SCAN consists of four successive processes. Illustrated processes A, B, C, and D are repeated in this order. In processes A and B, a group of sensor coils, comprising or a group of left sub-peak selection sensor coils 510b and a group of main-peak selection sensor coils 510a, are scanned respectively in a forward direction (process A) and in a reverse direction (process B). Conversely, in processes C and D, a group of sensor coils, comprising of a group of right sub-peak selection sensor coils 510c and a group of main-peak selection sensor coils 510a, are scanned respectively in a forward direction (process C) and in a reverse direction (process D). As with the previous embodiments, only the sub-peak selection sensor coils C-2 and C8 acquire data, and hence the scanning of the sensor coils C-1 and C7 can be omitted.

Even in the fifth embodiment, calculation routines 530 through 533 are respectively executed every time each process is completed, and results of the calculations are sent to the host machine. Each calculation routine in each process calculates a true coordinate value by averaging a temporary coordinate value calculated from a signal received during the process and another temporary coordinate value calculated from a signal received in the preceding process, and the obtained coordinate value is sent to the host machine together with inclination data. The inclination is calculated in each calculation routine in each process by the use of one of the right and left sub-peak values obtained in the present process and the most recent remaining sub-peak value obtained in the preceding. Turning to the example shown in the drawing, in the calculation routine 532 of process C, an inclination is calculated by the use of a right sub-peak value 520c obtained in process C and a left sub-peak value 521b obtained in process B. In the calculation routine 533 of process D, an inclination is calculated by the use of a right sub-peak value 521c obtained in process D and the left sub-peak value 521b obtained in process B. Particularly, when SECTOR SCAN consists of four processes as shown in the fifth embodiment, the following advantages will be obtained. Specifically, in addition to the contents of the calculation routines in the previous embodiments, it becomes possible to carry out correction calculation of an inclination, taking into account data of a coordinate value for obtaining a more accurate inclination value. Furthermore, in the same manner as in the calculation of a coordinate value, it becomes possible to obtain more accurate data by averaging inclination values respectively obtained for directions of scanning.

Even in the fifth embodiment, a scan time for one process is reduced, and it is also possible to eliminate an error of a coordinate value which exists in the directions of scanning. Moreover, in the fifth embodiment, scanning is continuously carried out from the left to the right, and from the right to the left, without skipping any one of sensor coils during one process. It can be said that the scans load the control section less.

Figure 8:
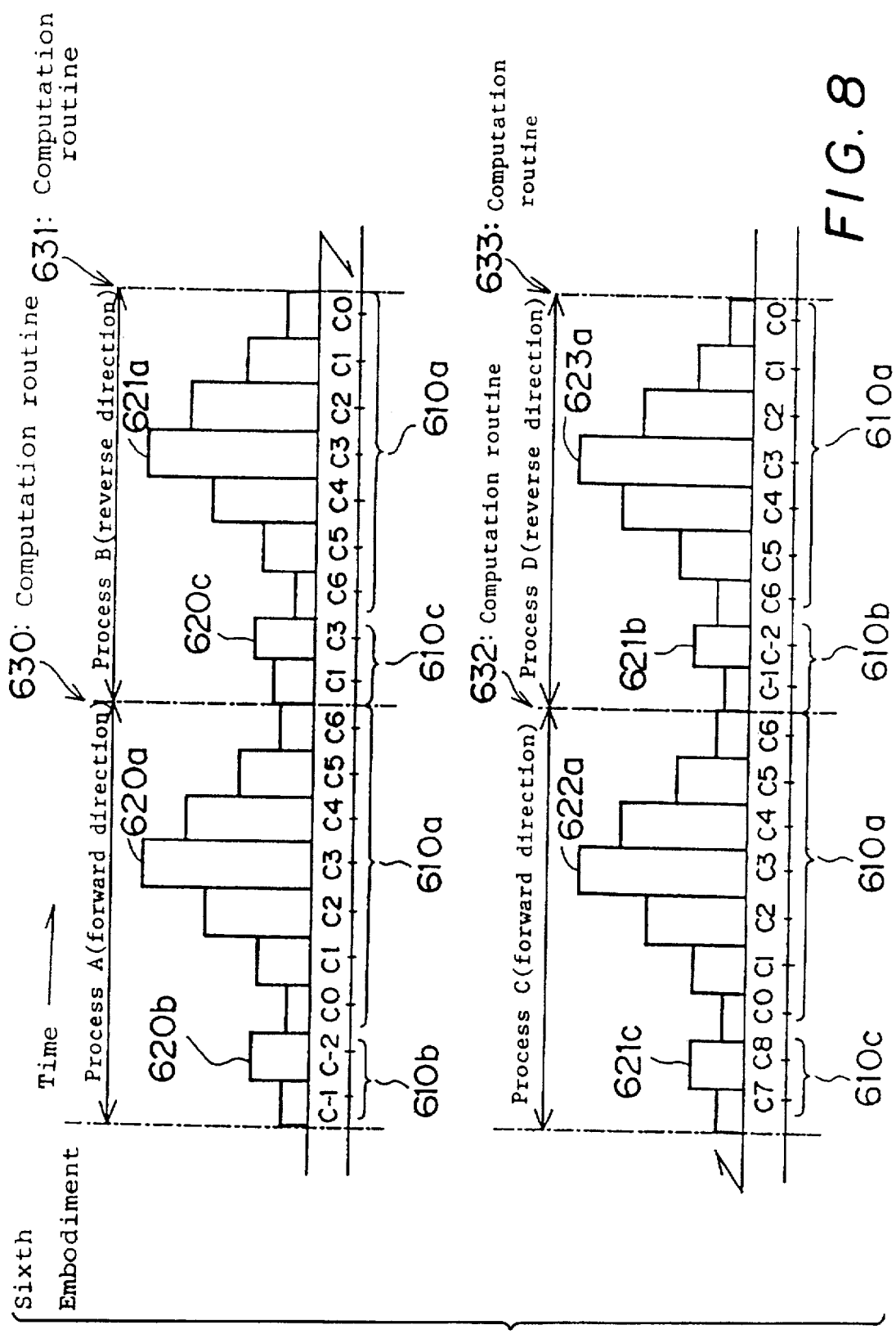
FIG. 8 is a chart showing the sensor coil scanning method for use in SECTOR SCAN in a sixth embodiment of the position sensing method for a coordinate input apparatus according to the present invention.

FIG. 8 shows the sensor coil scanning method for use in SECTOR SCAN in a sixth embodiment of the position sensing method for a coordinate input apparatus. FIG. 8 shows four successive processes in SECTOR SCAN, and illustrated processes A, B, C, and D are repeated in this order. The sixth embodiment is different from the fourth embodiment in that the group of main-peak selection sensor coils are scanned after a group of sub-peak selection sensor coils have been scanned in each process. Another feature of the sixth embodiment resides in the fact that when a group of sub-peak selection sensor coils are set to two, the sub-peak selection sensor coils C-2 and C8 which practically provide sub-peak values are scanned not first but second. As previously mentioned, results of the first transmission and receiving, obtained when the resonance circuit, or the like, of the position indicator is unstable, are not used as data, but results of the second transmission and receiving, obtained when the resonance circuit of the position indicator is stable, are used as data. Such a method is used when importance is put on the accuracy of an inclination. However, the order of scanned sensor coils is switched, and hence it can be said that such a scan heavily loads the control section.

It should be noted that the forward direction and the reverse direction in the scanning method of the present invention refer to the direction of scanning of at least the group of main-peak selection sensor coils. This is because the correction of an error caused by the previously mentioned residual induced voltage of the position indicator is carried with respect to a coordinate value obtained from a result of the scan of the group of main-peak selection sensor coils. Therefore, as with the sixth embodiment, the directions of scanning of the group of sub-peak selection sensor coils may not be matched with the directions of the scanning of the group of main-peak selection sensor coils.

In connection with the main peak of the sixth embodiment, as with the previous embodiments, a group of main-peak selection sensor coils 610a are alternately scanned in a forward direction and a reverse direction.

For the sub-peak in the sixth embodiment, in the processes A, B, C, and D, each group of sub-peak selection sensor coils are scanned in the order of a left sub-peak 610b and a right sub-peak 610c, and in the order of the right subpeak 610c and the left sub-peak 610b before the scanning of the group of main-peak selection sensor coils.

Even in the sixth embodiment, calculation routines 630 through 633 are respectively executed every time each process is completed, and results of the calculations are set to the host machine. Each of the calculation routines 630 through 633 includes averaging calculation of a coordinate value in order to cancel the influence of the residual induced voltage. Each calculation routine of each process calculates a true coordinate value by averaging a temporary coordinate value calculated from a received signal in the present process and another temporary coordinate value obtained from a received signal in the preceding process, and the obtained coordinate value is sent the host machine together with inclination data. In each calculation of each process, the inclination is calculated by the use of one of the right and left sub-peak values obtained in the present process and the most recent remaining sub-peak value obtained in the process before the present process. Even in the sixth embodiment, the SECTOR SCAN consists of four processes, and as with the fifth embodiment, it is possible for the calculation of inclination to have the correction and averaging of a coordinate value in order to obtain a more accurate inclination value.

In the fourth to sixth embodiments, it is impossible to execute ordinary calculation of an inclination when the first process (the fourth and sixth embodiments) and the second process (the fifth embodiment) of SECTOR SCAN have been completed, because only one of the sub-peak values is obtained. For this reason, with respect to the calculation of an inclination, only the first and second processes are subjected to special processing differing from the process to which the subsequent processes are subjected. This special processing will be described in detail with reference to FIG. 10.

Figure 9:
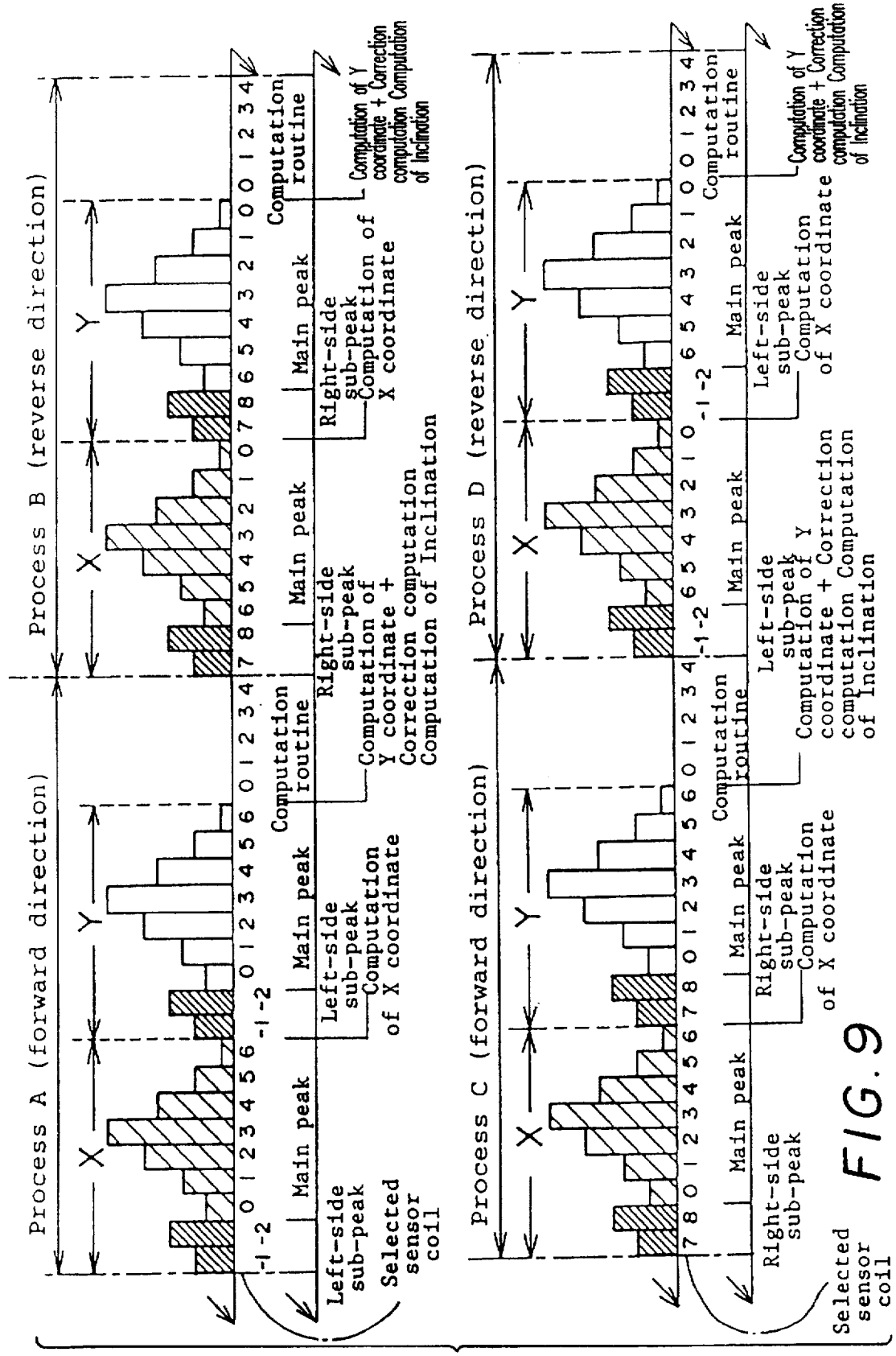
FIG. 9 is a chart showing the sensor coil scanning method in the sixth embodiment when it is applied to SECTOR SCAN intended to obtain coordinate values along X and Y axes and an inclination.

Throughout the drawings for the embodiments, for simplicity of explanation, scanning along only one axis (for example, the X axis) is illustrated. FIG. 9 is a chart showing one example, in which the sixth embodiment is applied to SECTOR SCAN for obtaining coordinate values and inclination for the X and Y axes. This example is different from the sixth embodiment shown in FIG. 8 in that both X and Y axes are scanned in each process. Calculation routines are executed for each process after the scan has been completed. For example, in a calculation routine after the scanning of process B, temporary coordinate values are calculated respectively for axes by interpolation calculation of a received signal obtained from a group of main-peak selection sensor coils. Two temporary coordinate values obtained in respective processes, that is, in a forward direction (process A) and in a reverse direction (process B) are averaged, whereby a true X coordinate value and a true Y coordinate value are calculated. In connection with the calculation of an inclination, an inclination along the X axis and an inclination along the Y axis are calculated, from a left-sub peak value of process A and a right sub-peak value of process B, respectively for the axes. The obtained coordinate value data and inclination data for each axis are sent to the host machine for each process.

As shown in FIG. 9, scanning along the X axis and scanning along the Y axis that is substantially subjected to parallel processing by carrying out time division is desirable. This is intended to reduce a difference when the X coordinate value is detected and when the Y coordinate value is detected as much as possible. Thereby, tracking of the sensing action of a coordinate with respect to the movement of the position indicator is improved.

Figure 10:
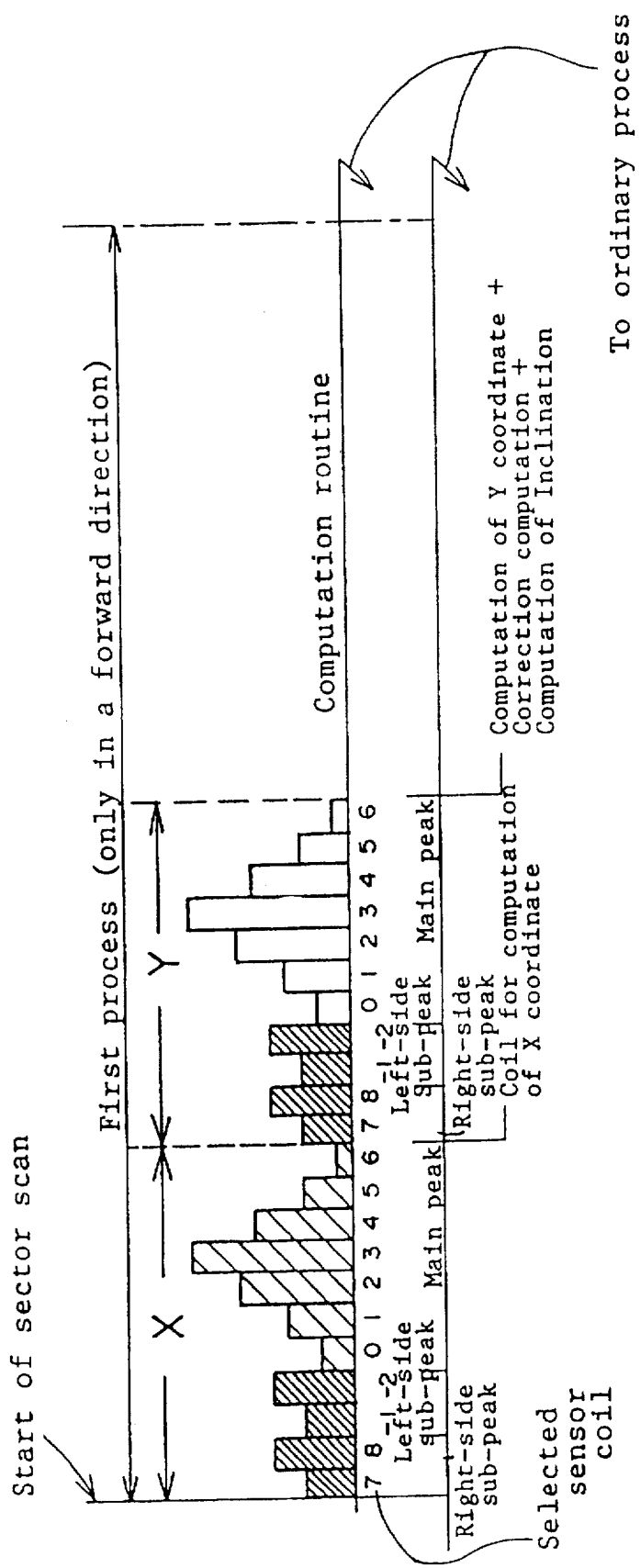
FIG. 10 is a chart showing one example of the first process in a scanning method in which a sub-peak value on one side only is obtained in one process of sector scan.

As already been mentioned, in the second, and fourth through sixth embodiments, on the assumption that the previously mentioned one process is carried out in the first process of SECTOR SCAN, only one sub-peak value is obtained. Hence, it is necessary to execute a special process, differing from the ordinary process, only for the first process. FIG. 10 shows one example of the first process for each of the previous embodiments. As can be seen from the drawing, it is necessary to scan the right and left sub-peak selection sensor coils together in the first process. As a result of this, it is possible to obtain both sub-peak values in the first process. To save a scan time, the group of main-peak selection sensor coils are scanned in only a forward direction in the first process. Assume that data obtained as a result of scan in a reverse direction are equal to the data obtained as a result of scan in a forward direction, taking no notice of errors. In this way, all of the data necessary for ordinary calculation routines are obtained, and hence it is possible to use a calculation routine, which is the same as the ordinary calculation routine, as a calculation routine in the first process. In this ordinary calculation routine, it is unnecessary to carry out averaging calculation of a coordinate value for the first process. However, compared with the case where another calculation routine which does not use averaging calculation is provided, the processing section undergoes a smaller load when the ordinary calculation routine is directly applied to the first process. In the calculation routines, coordinate values and indications are calculated respectively for the X and Y axes, and results of the calculation are sent to the host machine. The coordinate value and the both sub-peak values obtained in the first process are used in calculation routines in the following processes, as required. Hence, in any one of the embodiments, it is possible to start an ordinary process from the second process.

Figure 11:
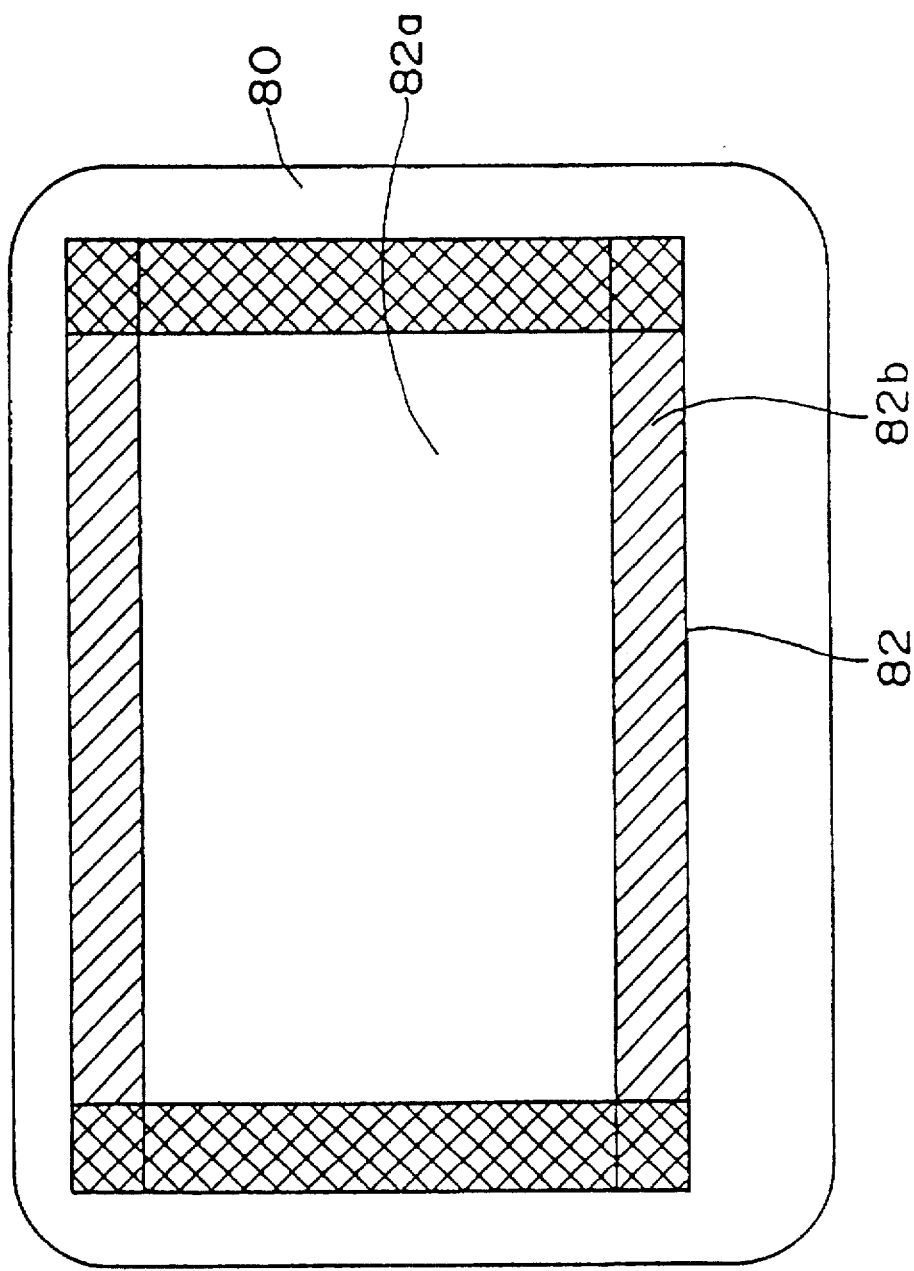
FIG. 11 is a schematic representation showing a sensor plane in the surface of a position sensing plate of a coordinate input apparatus and an effective area of the sensor plane.

An explanation will be Given of processing in the edge of the effective area of the sensor section of the coordinate input apparatus. FIG. 11 shows a surface of a position sensing plate 80 of the coordinate input apparatus. The inside of a rectangle 82 is an effective area of a sensor section. The effective area 82 can be divided into two areas; namely, a center region 82a (a white area) where right and left sub-peak values are obtained, and an edge region 82b (crosshatched regions along the X axis and hatched regions along the Y axis) where a sub-peak value only on one side is obtained. The sector scanning method shown in the previously mentioned embodiments can be applied to the center region 82a. There is no problem when a region required as data can be ensured by the use of only the center region 82a. However, when data of the edge region 82b are also used in the same manner as the data of the center region 82a, special processing is necessary.

Figure 12:
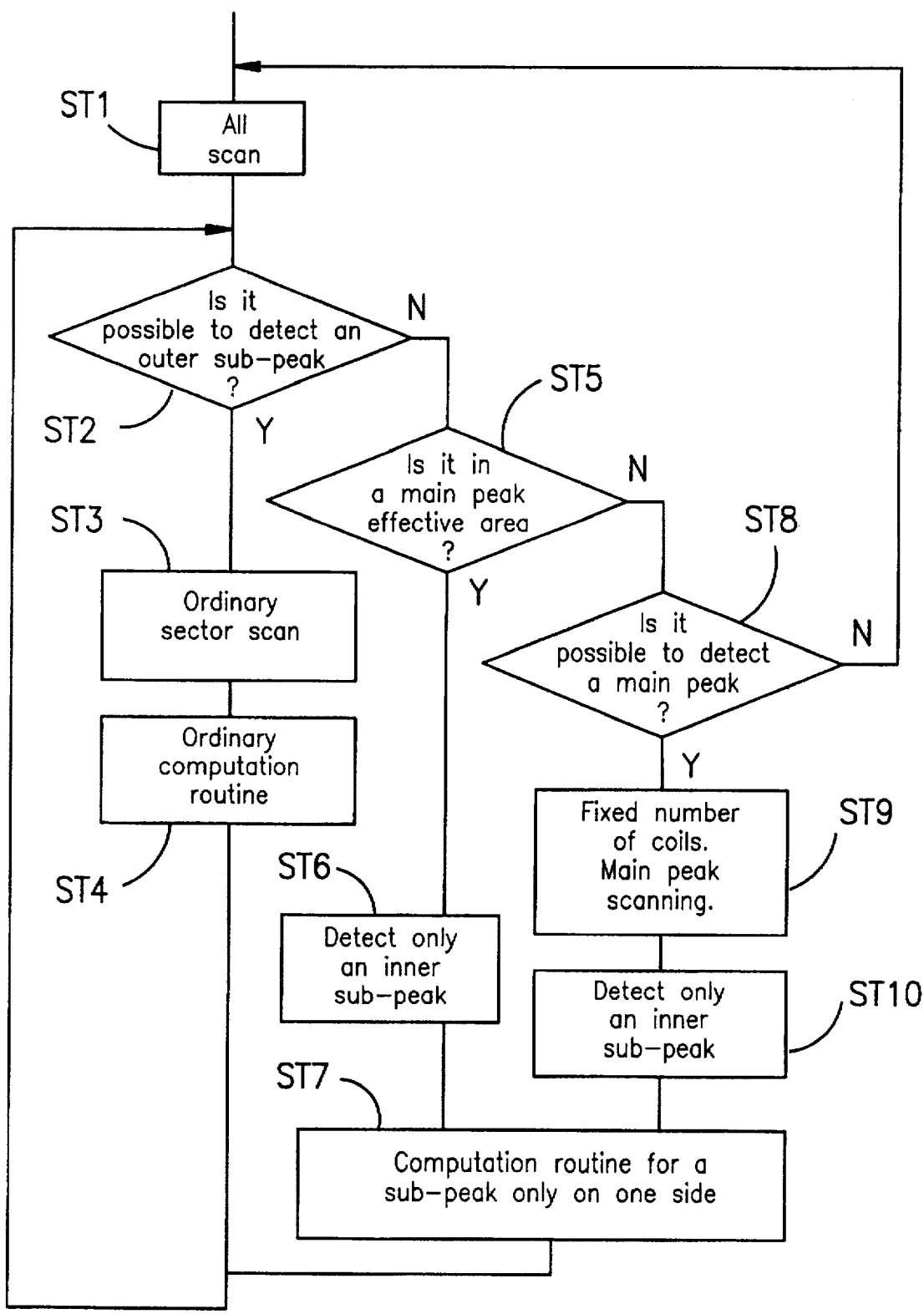
FIG. 12 is a flow chart illustrating a conventional sector scan method with respect to the edge regions in the effective area.

A conventional method for scanning the edge regions will now be described in detail before the method of scanning the edge region 82b according to the present invention will be explained. An explanation will be only given of one axis with reference to FIGS. 12 through 16, but the same explanation will be given of the other axis similarly. FIGS. 12 and 13A through 13D are flow charts for illustrating a conventional sector scan method for edge regions. FIG. 12 is a flow diagram and schematically shows the flow of conventional ALL SCAN and SECTOR SCAN. FIGS. 13A through 13D are charts showing the characteristics of a received signal in the vicinity of the edge region 82 of the sensor section under predetermined conditions. In FIGS. 13A through 13D (and FIGS. 15A through 15C), reference symbols S0, S1 . . . designate the absolute positions of a group of sensor coils in the effective area. In FIGS. 13A through 13D (and FIGS. 15A through 15C), a sensor coil positioned at the most left location in the effective area is designated by S0. On the other hand, C-2, C-1, . . . C7, C8 designate relative positions of a group of selection sensor coils which carry out SECTOR SCAN. In FIGS. 13A through 13D (and FIGS. 15A through 15C), a group of main-peak selection sensor coils are designated by C0–C6; a group of left sub-peak sensor coils being designated by C-2 and C-1; and right sub-peak selection sensor coils being designated by C7 and C8.

Figure 13A:
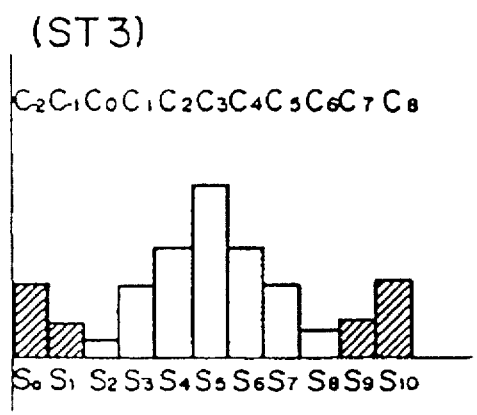
FIGS. 13A to 13D are charts illustrating the conventional sector scan method with respect to the edge regions in the effective area.

In the flow chart shown in FIG. 12, ST1 designates ALL SCAN. ST2 and ST8 designate three conditional branches based on results of ALL SCAN or previous SECTOR SCAN. In ST2, whether or not an outer sub-peak value is detectable is determined. The outer sub-peak value indicates a sub-peak value of both sub-peak values which is close to the edge region (corresponding to a left sub-peak value in FIGS. 13A through 13D). What the outer sub-peak value is detectable means that it is possible to ensure the number of sensor coils required for executing interpolation calculation when the interpolation calculation is executed with respect to sub-peak values as conventionally carried out. For simplicity of explanation, it means that one sub-peak selection sensor coil is detectable. If the outer sub-peak value is detectable, ordinary SECTOR SCAN will be executed in ST3, and an ordinary calculation routine will be executed in ST4. This is shown in FIG. 13A. Accordingly, in connection with the left edge region 82b, it will be possible to execute ordinary SECTOR SCAN if the left sub-peak selection sensor coil C-2 appears in an inner sensor coil compared with the sensor coil S0. ST3 and ST4 are usually repeated several times, but they will be omitted.

When the outer sub-peak value is undetectable, processing which does not detect the outer-peak value (including processing which sets a flag for instructing calculation of an inclination by the use of a sub-peak value only on one side in a subsequent calculation routine) is carried out in ST2.

Figure 13B:
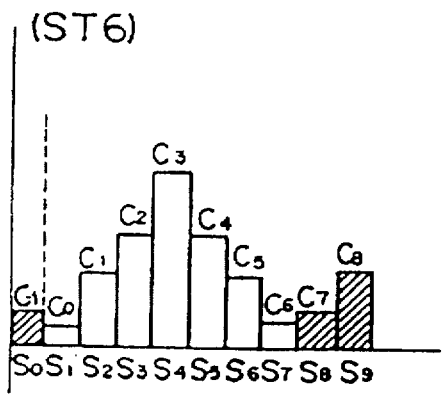
Figure 13C:
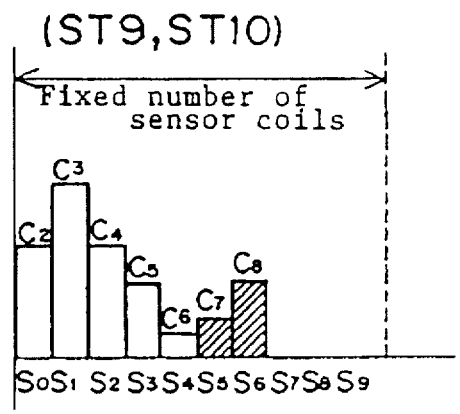

Thereafter, whether or not the group of main-peak selection sensor coils are in the effective area is determined in ST5. If the group of main-peak selection sensor coils are in the effective area, SECTOR SCAN including only the inner sub-peak will be executed in ST6 (FIG. 13B). If it is determined that some of the group of peak-selection sensor coils are outside the effective area in ST5, whether or not a main peak value is detectable will be determined in ST8. What the main peak value is detectable means that it is possible to ensure the minimum number of sensor coils required for executing interpolation calculation. For example, when interpolation calculation is executed by the use of data from three sensor coils, it means that three sensor coils (that is, C2 to C4) centered on a main-peak selection sensor coil C 3 which shows a main peak of the received signal are in the effective area. If the main peak value is detectable in ST8, processing will proceed to ST9. The number of selection sensor coils is fixed to a predetermined number (at least the number which makes it possible to ensure at least an inner peak value, and the number will be 10 in the example shown in the drawing ) in ST9. Only an inner sub-peak is subjected to SECTOR SCAN in ST10 (FIG. 13C). The processing proceeds to ST7, and a calculation routine, which includes the calculation of an inclination so as to calculate an inclination from a sub-peak only on one side, is executed. A coordinate value is ordinarily calculated in ST7.

Figure 13D:
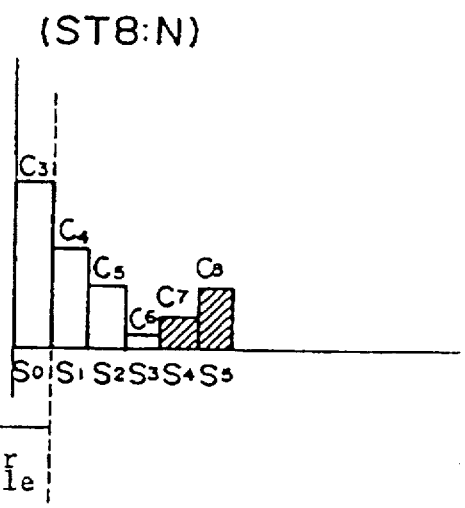
Figure 14:
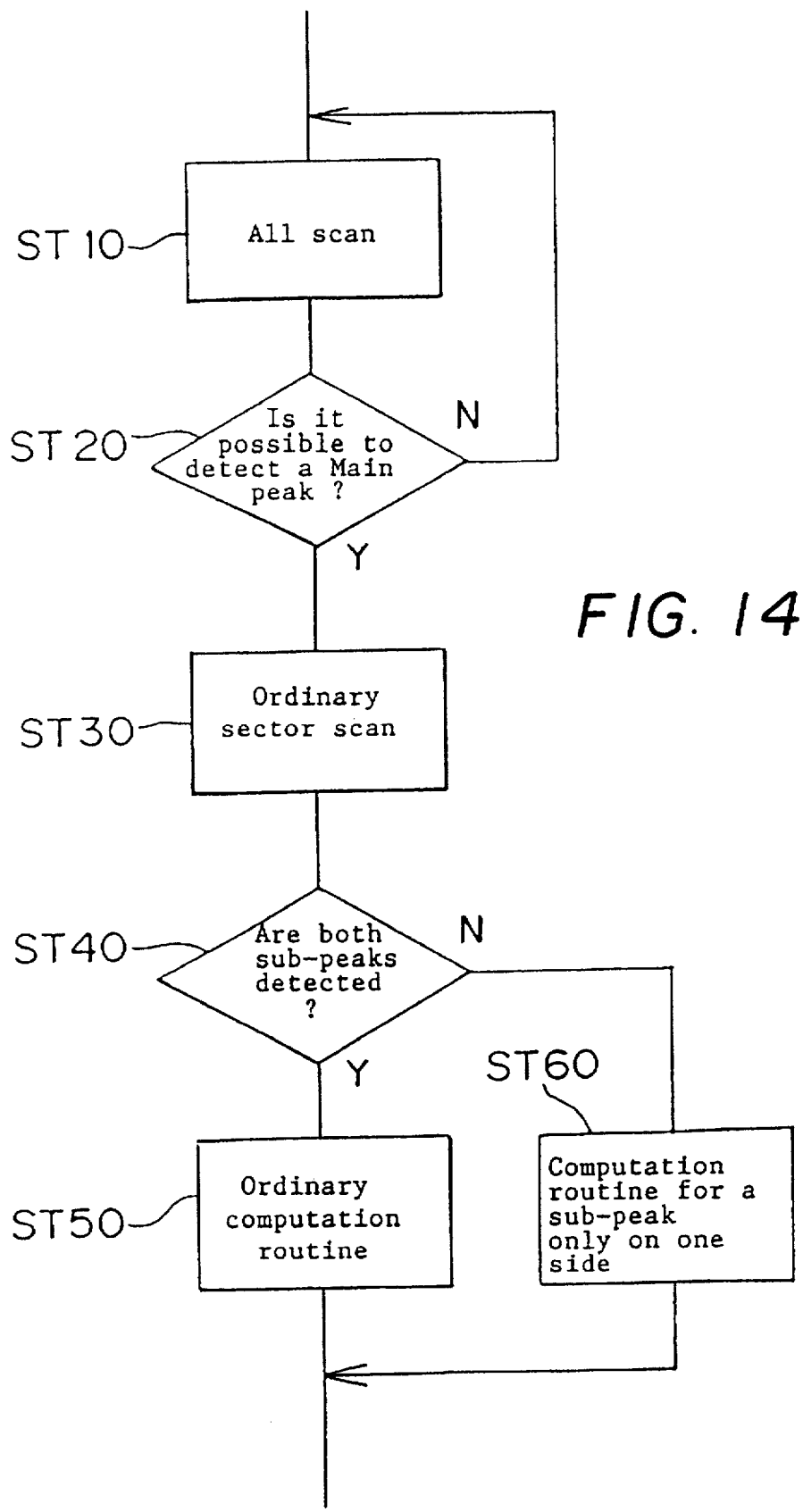
FIG. 14 is a flow chart showing a sector scan method of the present invention with respect to the edge regions in the effective area.

If the main peak value is undetectable in ST8, processing will return to ALL SCAN. Specifically, when data of three sensor coils are used in interpolation calculation of the main peak value, the main-peak selection sensor coil C3 is outside compared with the sensor coil S0 (FIG. 13D).

In the conventional sector scanning method for edge regions shown in FIGS. 12 and 13A through 13D, three conditional branches corresponding to ST2, ST5, and ST8 and processing corresponding to the branches are necessary. It is desirable for the control section that such conditional branches and the corresponding processing be reduced as much as possible so that the load on the control section will be minimized. If the conditional branches are few and the processing is small, the time required for SECTOR SCAN will also be reduced.

Figure 15A:
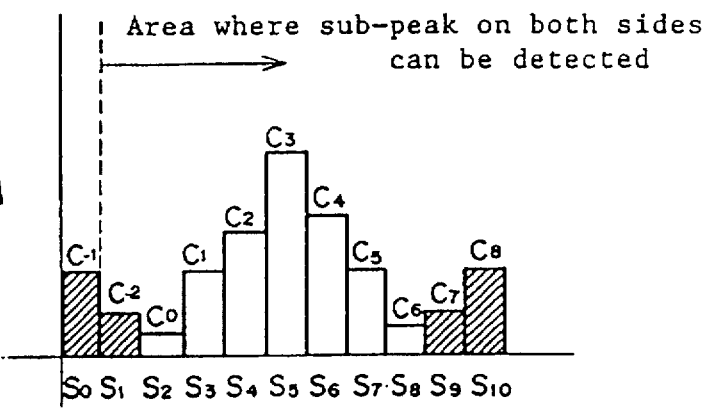
FIGS. 15A to 15C are charts showing the sector scan method of the present invention with respect to the edge regions in the effective area.
Figure 15B:
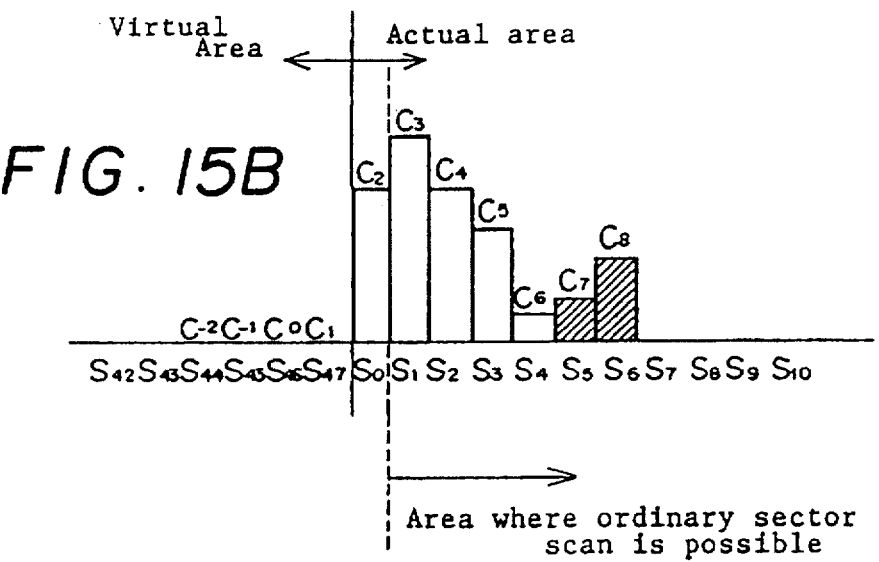

FIGS. 14 and 15A through 15C show a sector scan method for edge regions according to the present invention. ST10 designates ALL SCAN. ST20 shows a conditional branch based on a result of ALL SCAN. Whether or not the main peak value is detectable is determined in ST20. For example, if interpolation calculation is carried out by the use of data from three sensor coils, whether or not three sensor coils (that is, C2 to C4) centered on the main-peak selection sensor coil C3 which shows a main peak of a received signal are in the effective area will be determined. If it is determined that the main peak value is detectable in ST20, the processing will proceed to ST30, and ordinary SECTOR SCAN will be carried out. FIGS. 15A and 15B show the example in which the ordinary SECTOR SCAN is carried out. In the case of SECTOR SCAN shown in FIG. 15A, there is no problem because both sub-peaks are in the effective area. However, in the case of SECTOR SCAN shown in FIG. 15B, an outer sub-peak is not detected.

According to the present invention, the same SECTOR SCAN process is applied to either the case shown in FIG. 15A or the case shown in FIG. 15B. In the method of the present invention, it is considered that sensor coils in the sensor section are tentatively arranged into a ring pattern. In other words, when 48 sensor coils are actually arranged side by side from a sensor coil S0 on the left end to a sensor coil 47 on the right end, assume that the sensor coils S47, S46, follow from the left side of the sensor coil S0 on the left end, and that the sensor coil S0, the sensor coil S1, . . . follow from the right side of the sensor coil 47 on the right end. These are assumptions in sensor coil selection processing in the control section. Therefore, as shown in FIG. 15B, if the sensor coil S1 is selected as the main-peak selection sensor coil C3 by ALL SCAN, eleven sensor coils; namely, a sensor coil S44 (C-2), . . . a sensor coil S47 (C1), the sensor coil S0 (C2), . . . a sensor coil S6 (C8) are taken as a group of selection sensor coils in SECTOR SCAN in ST30, and SECTOR SCAN is executed for the group of selection sensor coils. As a matter of course, a received signal value actually obtained from the sensor coils S44 to S47 is zero. In other words, the selection of the sensor coils S44 to S47 is a dummy selection. When the dummy selection is carried out, it is necessary to execute processing to such an extent that some flag is set to indicate the execution of dummy selection. This processing is intended to give an instruction that the calculation of an inclination is carried out by the use of only a sub-peak on one side in the subsequent calculation routine.

Whether or not the right and left sub-peak values are detected as effective values is determined by the use of the flag in a signal processing subsequent to SECTOR SCAN. If both sub-peak values are actually detected in ST40, ordinary calculation routine will be executed in ST50. In the ordinary calculation routine, an inclination is calculated from both sub-peak values. If only a sub-peak value on one side is detected in ST40, a calculation routine, which includes a calculation so as to calculate an inclination from only the sub-peak value on one side, will be executed in ST60. Even in ST60, a coordinate value is ordinarily calculated.

Figure 15C:
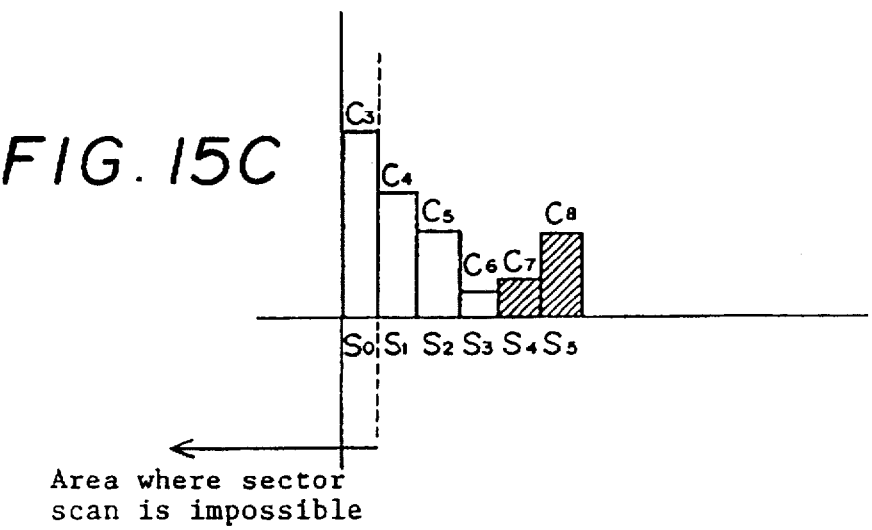

If a main peak value is undetectable in ST20, the processing will proceed to ALL SCAN. In other words, for example, when data of three sensor coils are used in interpolation calculation of the main peak value, the main-peak selection sensor coil C3 is situated outside when compared with the sensor coil S0 (FIG. 15C).

According to FIGS. 14, 15A through 15C, it is unnecessary to change the sector scan method even in the edge region so long as the main peak is detectable. Specifically, all that is needed to do is to execute only the same ordinary SECTOR SCAN as carried out in the center region. Compared with this, in the conventional method shown in FIGS. 12 and 13A through 13D, SECTOR SCAN is selected from any of a plurality of sector scan methods depending on the presence or absence of sub-peaks, and the selected scan is executed. According to the present invention, compared with the conventional method, the number of conditional branches are few and the corresponding processing is small, the control section undergoes a reduced load.

Figure 16A:
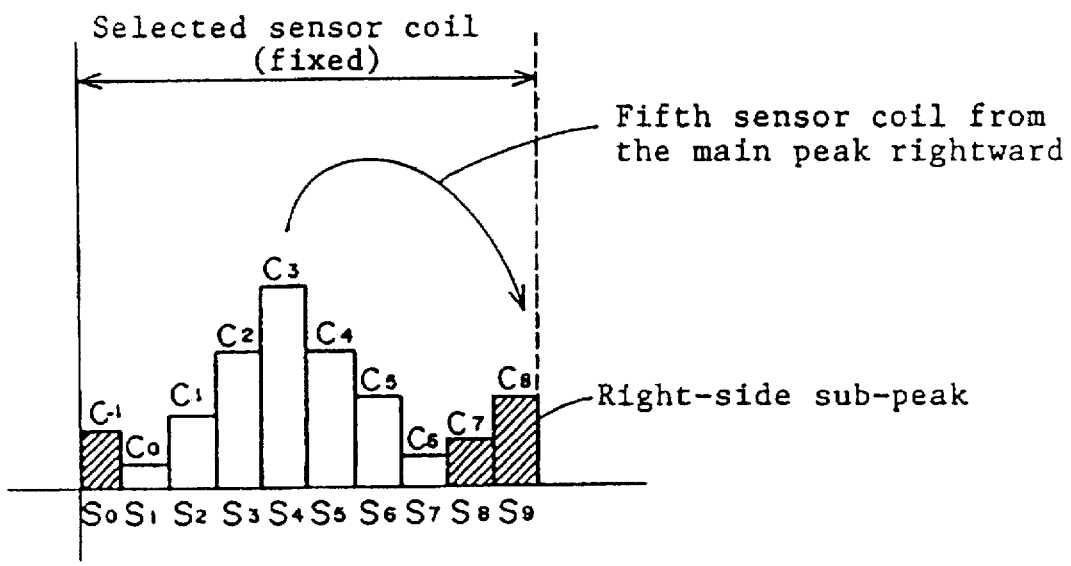
FIGS. 16A and 16B are charts showing a method of processing an inner sub-peak signal when the conventional sector scan method shown in FIG. 12 is used.
Figure 16B:
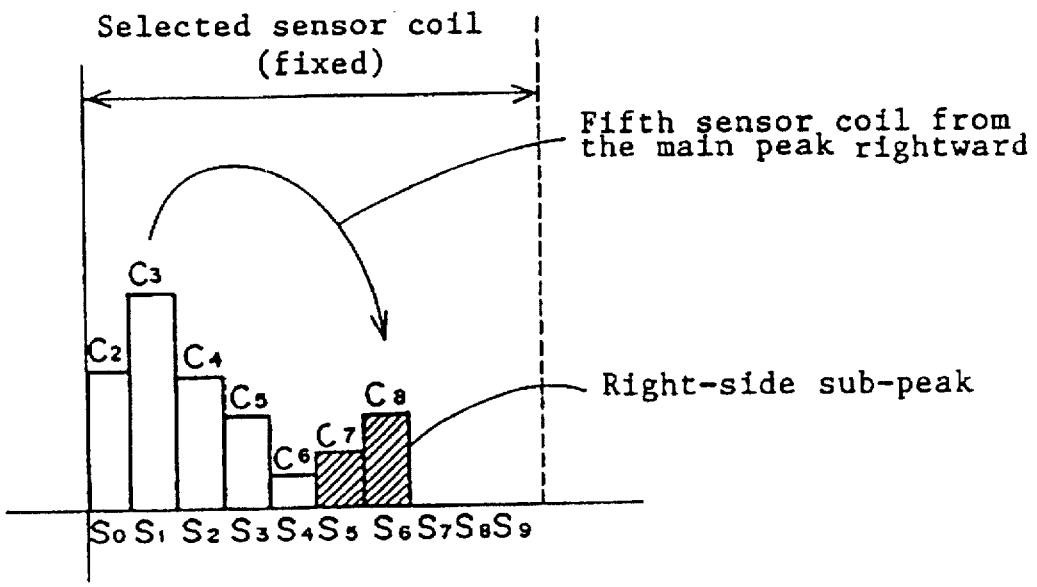

FIGS. 16A and 16B show an improved method for processing an inner sub-peak when the conventional SECTOR SCAN, shown in FIGS. 12 and 13A through 13D, is used. Sector scan, when only an inner sub-peak (a right sub-peak in the drawing) is detected, is executed in ST10 shown in FIG. 12. As shown in FIGS. 16A and 16B, the main-peak selection sensor coil C3 may move between the sensor coils S4 and S1 at this time. At this time, another sensor coil spaced apart from the main-peak selection sensor coil C3 by a predetermined interval is taken as an inner sub-peak selection sensor coil. In the illustrated example, a fifth sensor coil counted to the right from the main-peak selection sensor coil C3 in the illustrated example, is taken as an inner sub-peak selection sensor coil C8. This facilitates the determination of the inner sub-peak selection sensor coil.

Although, an explanation was given of the case where the sensor coil scanning method according to the present invention, particularly, the sector scan method is applied to a coordinate input apparats which uses the electromagnetic transfer method, the present invention is effective for application to a coordinate input apparatus which uses another position sensing method.

Specifically, the sector scanning method, according to the present invention, which uses the minimum sub-peak selection sensor coils is also applicable to all position sensing methods which have a process of scanning a plurality of sensor coils arranged on a sensor section, and detect not only a main peak signal but also right and left sub-peak signals for detecting an inclination. It is also possible to apply the sector scan method of the present invention for use in edge regions of the effective area of the sensor section with respect to the above mentioned position sensing methods.

Moreover, the problem of the residual induced voltage is not limited to the resonance circuit of the position indicator, but it also arises in a frequency filter, or the like, of a circuit for detecting a received signal. For this reason, the sector scan method, according to the present invention, which permits cancellation of residual induced voltages is applicable to all position sensing methods which have a process of scanning a plurality of sensor coils provided on a sensor section and employ an induced voltage in sensing a coordinate value.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. In a coordinate sensing apparatus having a sensor section which forms a sensor plane and consists of a plurality of sensor coils arranged side by side along coordinate axes, and a position indicator housing at least a coil, a position sensing method which obtains at least a coordinate value of a position indicated by the position indicator and an inclination of the position indicator in relation to the sensor plane by the use of a value of a sensing signal including a main peak value and at least one sub-peak value, both being obtained from interactive action between the position indicator and a specified sensor coil of the group of sensor coils, wherein the position sensing method comprises:

a SECTOR SCAN step of carrying out scanning along one specific coordinate axis of the coordinate axes to obtain at least (1) sensing signal from a group of main-peak selection coils including a main sensor coil which provides the main peak value and at least the number of sensor coils required for calculating the coordinate value by means of interpolation calculation, (2) a first sensing peak value from a first sub-sensor coil which provides a first sub-peak value on the left side of the main peak value with respect to the specific coordinate axis, and (3) a second sensing peak value from a second sub-sensor coil which provides a second sub-peak value on the right side of the main peak value with respect to the specific coordinate axis; and a calculation step of, calculating the coordinate value by means of interpolation calculation using the sensing signals obtained from the group of main-peak selection sensor coils, and also calculating the inclination using the first sensing peak value obtained from the first sub-sensor coil and the second peak value obtained from the second sub-sensor coil, at the time of sector scanning.

2. The position sensing method according to claim 1, wherein the SECTOR SCAN step includes scanning of a group of selection sensor coils in one direction along the specific coordinate axis, the group of selection sensor coils comprising:

(1) a group of main-peak selection sensor coils containing a main sensor coil which provides the main peak value, and at least the number of sensor coils required for calculating the coordinate value by means of interpolation calculation;

(2) a first sub-sensor coil which provides a first sub-peak value on the left side of the main peak value with respect to the direction of scanning; and (3) a second sub-sensor coil which provides a second sub-peak value on the right side of the main peak value with respect to the direction of scanning.

3. The position sensing method according to claim 1, wherein the SECTOR SCAN step includes a first step of scanning a group of first selection sensor coils in one direction along the specific coordinate axis, the first selection sensor coil group comprising:

(1) a group of main-peak selection sensor coils containing a main sensor coil which provides the main peak value, and at least the number of sensor coils required for calculating the coordinate value by means of interpolation calculation, and (2) a first sub-sensor coil which provides a first sub-peak value, and a second step of scanning a group of second selection sensor coils in one direction along the specific coordinate axis, the second selection sensor coil group comprising:

(1) a group of main-peak selection sensor coils containing a main sensor coil which provides the main peak value, and at least the number of sensor coils required for calculating the coordinate value by means of interpolation calculation, and (2) a second sensor coil which provides a second sub-peak value; and wherein the calculation step includes, the steps of:

calculating the coordinate value by means of interpolation calculation using sensing signal obtained from the group of main-peak selection sensor coils, and calculating the inclination using the most recent sensing peak value obtained from the first sub-sensor coil and the most recent sensing peak value obtained from the second sub-sensor coil.

4. The position sensing method according to claim 1, wherein the SECTOR SCAN step includes a first step of scanning, in one direction along the specific coordinate axis, (1) a group of main-peak selection sensor coils containing a sensor coil which provides the main peak value, and at least the number of sensor coils required for calculating the coordinate value by means of interpolation calculation, and (2) a first sub-sensor coil which provides a first sub-peak value, (3) a second sub-sensor coil which provides a second sub-peak value, and a second step of scanning the group of selection sensor coils in a reverse direction with respect the direction of scanning in the first step; and wherein the calculation step includes, the steps of:

calculating temporary coordinate values respectively in the first and second steps by means of interpolation calculation, using sensing signals obtained from the group of main-peak selection coils, calculating the coordinate value by averaging the two most recent temporary coordinate values, and calculating the inclination using the most recent sensing peak value obtained from the first sub-sensor coil and the most recent sensing peak value obtained from the second sub-sensor coil.

5. The coordinate sensing method according to claim 1, wherein the SECTOR SCAN step includes a first step of scanning, in one direction along the specific coordinate axis, a group of first selection sensor coils comprising:

(1) a group of main-peak selection sensor coils containing a sensor coil which provides the main peak value, and at least the number of sensor coils required for calculating the coordinate value by means of interpolation calculation, and (2) a first sub-sensor coil which provides a first sub-peak value, a second step of scanning the group of first selection sensor coils in a reverse direction with respect to the direction of scanning in the first step, a third step of scanning, in one direction along the specific coordinate axis, a group of second selection sensor coils comprising:

(1) a group of main-peak selection sensor coils containing a sensor coil which provides the main peak value, and at least the number of sensor coils required for calculating the accurate coordinate value by means of interpolation calculation, (2) a second sub-sensor coil which provides a second sub-peak value, and a fourth step of scanning the group of second sensor coils in a reverse direction with respect to the direction of scanning in the third step; and wherein the calculation step includes the steps of, the steps of:

calculating temporary coordinate values respectively in the first to fourth steps, using sensing signals obtained from the group of main-peak selection coils, calculating the coordinate value by averaging the two most recent temporary coordinate values, and calculating the inclination using the most recent sensing peak value obtained from the first sub-sensor coil and the most recent sensing peak value obtained from the second sub-sensor coil.

6. The position sensing method according to claim 1, wherein the SECTOR SCAN step includes first to fourth steps, each step having the steps of:

scanning, in one direction, or in a reverse direction thereto, along the specific coordinate axis, a group of main-peak selection sensor coils containing a sensor coil which provides the main peak value, and at least the number of sensor coils required for calculating the coordinate value by means of interpolation calculation, and scanning, along the specific coordinate axis, either a first sub-sensor coil which provides the first sub-peak value or a second sub-sensor coil which provides the second sub-peak value; and wherein the calculation step includes, the steps of:

calculating temporary coordinate values respectively in the first to fourth steps, using sensing signals obtained from the group of main-peak selection sensor coils, calculating the coordinate value by averaging the most recent temporary coordinate value obtained as a result of the scanning in one direction and the most recent temporary coordinate value obtained as a result of the scanning in a reverse direction, and calculating the inclination using the most recent sensed peak value obtained from the first sub-sensor coil and the most recent sensed peak value obtained from the second sub-sensor coil.

7. The position sensing method according to claim 6, wherein each of the first to fourth steps of the SECTOR SCAN step carries out scanning of either the first sub-sensor coil or the second sub-sensor coil before the group of main-peak selection sensor coils.

8. The position sensing method according to claim 6, wherein the order of the first to fourth steps of the SECTOR SCAN step is set in such a way that the group of main-peak selection sensor coils are alternately scanned in one direction and in a reverse direction, and that the first and second sub-sensor coils are alternately scanned.

9. The position sensing method according to claim 1, wherein when at least the group of main-peak selection sensor coils are present in an effective area in the sensor plane but some of the remaining sensor coils are out of the effective area of the sensor plane during SECTOR SCAN, scanning is carried out by selecting one or a plurality of other sensor coils located in the effective area instead of the sensor coils located out of the effective area.

10. The position sensing method according to claim 9, wherein the selected sensor coil or coils are selected from a region along one edge of the effective area which is on the opposite side to the specific coordinate axis.

11. The position sensing method according to claim 9, wherein when either the first sub-sensor coil or the second sub-sensor coil is situated out of the effective area, the inclination is calculated by the use of only a sensed peak value obtained as a result of the scanning of either the first sub-sensor coil or the second sub-sensor coil situated in the effective area.

12. The position sensing method according to claim 1, wherein the main peak value and the first and second sub-peak values, which sector scanning is based on, are obtained by ALL SCAN which roughly scans the entire sensor plane.

13. The position sensing method according to claim 1, wherein when the coordinate value and the inclination of the moving position indicator are calculated by repeating SECTOR SCAN, the main peak value and the first and second sub-peak values on which the present SECTOR SCAN is based on are obtained by SECTOR SCAN just prior to the present SECTOR SCAN.

14. The position sensing method according to claim 1, wherein when the first sub-sensor coil is scanned in the SECTOR SCAN step, at least one sensor coil adjacent to the first sub-sensor coil is also scanned; and wherein when the second sub-sensor coil is scanned in the SECTOR SCAN step, at least one sensor coil adjacent to the second sub-sensor coil is also scanned.

15. The position sensing method according to claim 14, wherein a coil adjacent to either the first sub-sensor coil or the second sub-sensor coil is scanned before the first sub-sensor coil or the second sub-sensor coil.

16. The position sensing method according to claim 1, wherein the calculated coordinate value is used in calculating the inclination in the calculation step.

17. The position sensing method according to claim 3, wherein when the main peak value and the first and second sub-peak values on which SECTOR SCAN is based are obtained by ALL SCAN which roughly scans the entire sensor plane, both the first sub-sensor coil and the second sub-sensor coil being scanned in only the first step of the SECTOR SCAN step; the coordinate value being calculated by interpolation calculation using a sensed signal obtained from the group of main-peak selection sensor coils; and the inclination being calculated by the use of two sensed peak values obtained from the first and second sub-sensor coils.

18. The position sensing method according to claim 6, wherein when the main peak value and the first and second sub-peak values on which SECTOR SCAN is based are obtained by ALL SCAN which roughly scans the entire sensor plane, both the first sub-sensor coil and the second sub-sensor coil being scanned in only the first step of the SECTOR SCAN step; the coordinate value being calculated by interpolation calculation using a sensed signal obtained from the group of main-peak selection sensor coils; and the inclination being calculated by the use of two sensed peak values obtained from the first and second sub-sensor coils.

19. The position sensing method according to claim 1, wherein if at least the group of main-peak selection coils are situated in an effective area in the sensor plane but a part of the remaining coils exist outside the effective area when the SECTOR SCAN step is carried out, SECTOR SCAN is carried out by taking a predetermined number of sensor coils, arranged along a border edge between the effective area and the outside of the effective area, as a group of selection sensor coils; a sensed signal value indicated by a sensor coil, spaced apart from a sensor coil of the group of selection sensor coils showing a main peak value by a predetermined number which is smaller than the predetermined number, as a sensed peak value from a sub-sensor coil; and the inclination is calculated by the use of only the sensed peak value.

20. The position sensing method according to claim 1, wherein the SECTOR SCAN step and the calculation step are carried out, in order, with respect to a plurality of specific coordinate axes.

21. The position sensing method according to claim 1, wherein the SECTOR SCAN step and the calculation step with respect to a plurality of specific coordinate axes are subjected to time division and parallel processing.

* * * * *